US008477046B2

(12) United States Patent
Alonso

(10) Patent No.: US 8,477,046 B2
(45) Date of Patent: Jul. 2, 2013

(54) SPORTS TELEMETRY SYSTEM FOR COLLECTING PERFORMANCE METRICS AND DATA

(75) Inventor: Ramon A. Alonso, Miami, FL (US)

(73) Assignee: Advanced Technologies Group, LLC, Miami, FL (US)

(*) Notice: Subject to any disclaimer, the term of this patent is extended or adjusted under 35 U.S.C. 154(b) by 0 days.

(21) Appl. No.: 13/612,212

(22) Filed: Sep. 12, 2012

(65) Prior Publication Data

US 2013/0066448 A1 Mar. 14, 2013

Related U.S. Application Data

(63) Continuation-in-part of application No. 12/772,599, filed on May 3, 2010, now Pat. No. 8,289,185.

(60) Provisional application No. 61/175,497, filed on May 5, 2009, provisional application No. 61/237,499, filed on Aug. 27, 2009.

(51) Int. Cl.
*G08C 19/04* (2006.01)
(52) U.S. Cl.
USPC .................................. 340/870.11; 340/573.1

(58) Field of Classification Search
USPC .. 340/870.11, 573.1, 539.13, 572.1; 702/187; 342/127
See application file for complete search history.

(56) References Cited

U.S. PATENT DOCUMENTS 8,360,904 B2 * 1/2013 Oleson et al. ................. 473/570

* cited by examiner

*Primary Examiner* — Joseph Lauture
(74) *Attorney, Agent, or Firm* — Rafael A. Perez-Pineiro; Feldman Gale, P.A.

(57) ABSTRACT

Systems and methods for collecting sports data include measuring, at one or more sensor modules mounted, affixed, or embedded on at least one sports participant, data corresponding to identification, movement, position, or condition of the at least one sports participant; measuring, at one or more sensor modules mounted, affixed, or embedded in a sports object, data corresponding to identification, movement, position, or condition of the sports object; and broadcasting, from one or more telemetry modules mounted, affixed, or embedded on the sports object or on the at least one sports participant, signals carrying the data corresponding to identification, movement, position, or condition of the sports object or signals carrying the data corresponding to identification, movement, position, or condition of the at least one sports participant. In one embodiment, predictive action cameras are controlled to aim at an anticipated or predicted position of a sports participant or sports object.

47 Claims, 18 Drawing Sheets

FIG. 4

QB Stats & Telemetry (Per Play)

| Play | Attempt | Comp. | Dist. (Yards) | TD | Int. | Ball Speed (MPH) | Ball Spin (RPM) | Pass Elevation (Feet) | Ball Angle (Degrees) | Sacks | Sack Impact (G Force) | Vertical Leap (Inches) | FUM | Lost FUM | Rush | Total Yards | Dist. (Yards) |
|---|---|---|---|---|---|---|---|---|---|---|---|---|---|---|---|---|---|
| 1 | 1 | 1 | 35.991 | 0 | 0 | 47.8 | 129 | 37.9 | 8.1 | 1 | 374 | 0.000 | 0 | 0 | | | |
| 2 | 0 | 0 | 0.000 | 0 | 0 | 0.000 | 0.000 | 0.000 | 0.000 | 0 | 0.000 | 0.000 | | | 1 | 12.113 | 10.131 |
| 3 | | | | | | | | | | | | | | | | | |

Passing columns grouped under "Passing"; Fumbles columns under "Fumbles"; Rushing columns under "Rushing".

Continued To 8B

Legend

| | |
|---|---|
| XX | Traditional Stats |
| XX | Traditional Stats Enhanced with Sports Traxx System |
| XX | Telemetry Stats using Sports Traxx System |

Continued From 8A

| Rushing | | | | | | Fumbles | | Start of Play | Player Location | | | Bio Stats | | Current Play | Player Location | | Continued To 8C |
|---|---|---|---|---|---|---|---|---|---|---|---|---|---|---|---|---|---|
| TD | Rushing Speed (MPH) | Top Burst Speed (MPH) | Blocking Impact (G-Force) | Tackled Impact (G-Force) | Vertical Leap (Inches) | FUM | Lost FUM | | Longitude | Latitude | | Bio-Heart (BPM) | Bio-Temp (F) | | Longitude | Latitude | |
| 0 | 17.83 | 19.13 | 2.1 | 3.2 | 11.36 | 1 | 0 | | 80°14'20" | 25°37'29" | | 92 | 99.3 | | 80°19'20" | 25°38'15" | |
| | | | | | | | | | 80°39'15" | 25°67'35" | | 93 | 99.4 | | 80°53'11" | 25°63'25" | |

FIG. 8C

Continued From 8B

| Bio Stats | | End of Play | Player Location | | Bio Stats | |
|---|---|---|---|---|---|---|
| Bio-Heart (BPM) | Bio-Temp (F) | | Longitude | Latitude | Bio-Heart (BPM) | Bio-Temp (F) |
| 96 | 99.4 | | 80°39'15" | 25°67'35" | 99 | 99.5 |
| 97 | 99.5 | | 80°63'15" | 25°97'24" | 100 | 99.8 |

WR Stats & Telemetry (Per Play)

| Play | Rec. | Dist. (Yards) | TD | Receiving Speed (MPH) | Receiving - Top Burst Speed (MPH) | Receiving - Blocking Impact (G-Force) | Receiving - Tackled Impact (G-Force) | Receiving - Vertical Leap (Inches) | Fumbles - FUM | Fumbles - Lost FUM | Rush | Dist. (Yards) | TD | Rushing Speed (MPH) | Rushing - Top Burst Speed (MPH) | Rushing - Blocking Impact (G-Force) | Rushing - Tackled Impact (G-Force) |
|---|---|---|---|---|---|---|---|---|---|---|---|---|---|---|---|---|---|
| 1 | 1 | 55.79 | 1 | 19.1 | 21.1 | 0.00 | 3.90 | 17.35 | 0 | 0 | | | | | | | |
| 2 | | | | | | | | | | | 1 | 3.972 | 0 | 16.3 | 19.3 | 2.1 | 0.00 |

Continued to 9B

Legend

| | |
|---|---|
| XX | Traditional Stats |
| XX | Traditional Stats Enhanced with Sports Traxx System |
| XX | Telemetry Stats using Sports Traxx System |

| Fumbles | | Start of Play | Player Location | | Bio Stats | | Current Play | Player Location | | BIO Stats | | End of Play |
|---|---|---|---|---|---|---|---|---|---|---|---|---|
| Vertical Leap (Inches) | FUM | Lost FUM | | Longitude | Latitude | Bio-Heart (BPM) | Bio-Temp (°F) | | Longitude | Latitude | Bio-Heart (BPM) | Bio-Temp (°F) | |
| 17.35 | 0 | 0 | | 80°14'20" | 25°57'28" | 92 | 99.3 | | 80°19'20" | 25°59'15" | 96 | 99.4 | |
| | | | | 80°33'15" | 25°67'35" | 93 | 99.4 | | 80°53'17" | 25°63'25" | 97 | 99.5 | |

Continued From 9A — Continued To 9C

FIG. 9C

| Player Location | | BIO Stats | |
|---|---|---|---|
| Longitude | Latitude | Bio-Heart (BPM) | Bio-Temp (°F) |
| 80°33'15" | 25°07'35" | 99 | 99.5 |
| 80°63'15" | 25°07'24" | 100 | 99.8 |

Continued from 9B

FIG. 10A

Defensive Player Stats & Telemetry (WEEKLY, Per Game)

| Week | Tackles | Solos | Asst. | Sacks | Safety | Avg. Tackle Speed (MPH) | Avg. Top Burst Speed (MPH) | Avg. Tackle Impact (G-Force) | Avg. Vertical Leap (Inches) | Fumbles FUM | Lost FUM | PDef | Int | Yds | Interceptions Avg. | Long | TD | Avg. Run Speed (MPH) | Top Burst Speed (MPH) | Avg. Blocking Impact (G-Force) | Avg. Tackle Impact (G-Force) | Avg. Vertical Leap (Inches) | Continued To 10B |
|---|---|---|---|---|---|---|---|---|---|---|---|---|---|---|---|---|---|---|---|---|---|---|---|
| 1 | 27 | 7 | 10 | 1 | 1 | 19.18 | 21.14 | 3.9 | 12.3 | 0 | 0 | 30 | 2 | 2 | 3.9 | 7.8 | 0 | 16.31 | 19.37 | 0 | 3.1 | 17.35 | |

Legend

| xx | Traditional Stats |
|---|---|
| xx | Traditional Stats Enhanced with Sports Traxx System |
| xx | Telemetry Stats using Sports Traxx System |

FIG. 10B

| Fumbles | | Bio Stats | | Start of Play | | Bio Stats | | Current Play | | Bio Stats | | End of Play | | BIO Stats | |
|---|---|---|---|---|---|---|---|---|---|---|---|---|---|---|---|
| FUM | Lost FUM | Bio-Heart (BPM) | Bio-Temp (F) | | | Bio-Heart (BPM) | Bio-Temp (F) | | | Bio-Heart (BPM) | Bio-Temp (F) | | | Bio-Heart (BPM) | Bio-Temp (F) |
| | | 92 | 98.3 | | | 96 | 98.4 | | | | | | | 99 | 98.5 |
| | | 93 | 98.4 | | | 97 | 98.5 | | | | | | | 100 | 98.6 |

Continued From 10A

FIG. 11A

| Punter Stats & Telemetry (Per Play) | | | | | | | | | | | | | | | | | | | | | | |
|---|---|---|---|---|---|---|---|---|---|---|---|---|---|---|---|---|---|---|---|---|---|---|
| | | Punting | | | | | | | | | | | | | | | Fumbles | | Rushing | | | Continued To 11B |
| Play | Punts | Dist. (Yds) | In 20 | TB | TBw | BP | RET | Yds | NET | Kick Impact (G-Force) | Foot Speed (MPH) | Kick Elev. (Feet) | Ball Speed (MPH) | Ball Spin (RPM) | Ball Angle (Degrees) | Hang Time (Sec) | Sack | Sack Impact (G-Force) | Vertical Leap (Inches) | FUM | Lost FUM | Attempts | Dist. (Yds) |
| 1 | 1 | 57.53 | 1 | 0 | 0 | 0 | 1 | 34.21 | 29.3 | 9.7 | 89.31 | 37.9 | 47.8 | 129 | 8.1 | 4.123 | 0 | 0 | 0 | 0 | 0 | | |
| 2 | | | | | | | | | | | | | | | | | | | | | | 1 | 12.113 |

Legend

| | |
|---|---|
| XX | Traditional Stats |
| XX | Traditional Stats Enhanced with Sports Traxx System |
| XX | Telemetry Stats using Sports Traxx System |

FIG. 11B

| Continued From 10A | Rushing | | | | Fumbles | | | Player Location | | Bio Stats | | Current Play | Player Location | | Bio Stats | | End Of Play | Player Location | | Bio Stats | |
|---|---|---|---|---|---|---|---|---|---|---|---|---|---|---|---|---|---|---|---|---|---|
| | Rushing Speed (MPH) | Top Burst Speed (MPH) | Blocking Impact (G-Force) | Tackled Impact (G-Force) | Vertical Leap (Inches) | FUM | Lost FUM | Start of Play Longitude | Latitude | Bio-Heart (BPM) | Bio-Temp (F°) | | Longitude | Latitude | Bio-Heart (BPM) | Bio-Temp (F°) | | Longitude | Latitude | Bio-Heart (BPM) | Bio-Temp (F°) |
| | 9.15 | 11.3 | 2.1 | 3.2 | 0 | 0 | 0 | 80°14'20" | 25°27'23" | 92 | 99.3 | | 80°19'20" | 25°30'29" | 96 | 99.4 | | 80°33'20" | 25°07'35" | 99 | 99.5 |
| | | | | | | | | 80°32'15" | 25°03'35" | 93 | 99.4 | | 80°53'1" | 25°03'35" | 97 | 99.5 | | 80°05'15" | 25°03'24" | 100 | 99.8 |

| Current Down | Scrimmage Line Marker | Field Location | | First Down Marker | Field Location | | Current Location Marker | Field Location | |
|---|---|---|---|---|---|---|---|---|---|
| | | Longitude | Latitude | | Longitude | Latitude | | Longitude | Latitude |
| 1st | 16.6 | 80°14'20" | 25°57'29" | Goal Line | 81°31'11" | 25°45'19" | 16.6 | 80°14'20" | 25°57'29" |
| 2nd | | | | | | | | | |
| 3rd | | | | | | | | | |
| 4th | | | | | | | | | |

| Legend | |
|---|---|
| XX | Traditional Stats |
| XX | Traditional Stats Enhanced with Sports Traxx System |
| XX | Telemetry Stats using Sports Traxx System |

FIG. 12

SPORTS TELEMETRY SYSTEM FOR COLLECTING PERFORMANCE METRICS AND DATA

CROSS-REFERENCE TO RELATED APPLICATION

This application is a continuation-in-part of U.S. patent application Ser. No. 12/772,599 filed on May 3, 2010, which claims the benefit of U.S. Provisional Application No. 61/175,497, filed on May 5, 2009, and U.S. Provisional Application No. 61/237,499, filed on Aug. 27, 2009, the entireties of which are incorporated herein by reference.

FIELD OF THE INVENTION

The present invention generally relates to methods and systems for collecting performance data during sports events or practice sessions. More particularly, the present invention may be embodied as an electronic ecosystem of different technologies related to telemetry and analysis of performance metrics, data, analytics and/or statistics.

BACKGROUND OF THE INVENTION

The gathering, processing, and use of data and statistics are an important aspect of the business, analysis and appreciation of sports. Amateur and professional teams, coaches, and fans record and evaluate data and statistics for comparing the performance of teams and individual athletes. Teams, coaches, scouts, agents, and fans also review data, video, and statistics to analyze athletic performance and ability thereby enhancing the appreciation of the player's athletic accomplishments. Teams and coaches use data, video, and statistics to evaluate present and potential athletes, and their performances. They also plan game strategies based upon opponents' athletic abilities and performance data and statistics.

Advancements in technology and computerized data processing have developed modeling software, analytics, applications, and websites which, with the input of detailed statistical data, may track and/or predict the sequence of interactions forming a virtual sporting event from actual sporting events and essentially produce an artificial or simulated athletic competition.

The term "Fantasy Sports" has been used to identify the process of using sports modeling software, analytics, applications and statistical data to virtually assemble teams of selected athletes and operate the computer to predict the sequence of interactions forming an athletic competition between fans and their teams. Computer modeling of sports events has become a popular leisure and fan activity which has evolved into an important commercial sector of the sports business.

Potential player scouting and drafting continues to be a critical component of a team's future. College and professional sports invest great resources, time and money into reviewing prospective athletes. The scouts obtain and evaluate the athlete's capabilities, including speed, movement, skills, and agility. In addition to the player's previous game history, professional sports invest in major events as the National Football League (NFL) Combine, "Pro Days" and private practices as a means for evaluating specific players and potential performance. Other information is gathered via review of countless hours of game video, player data and statistics, and the like.

The prior art methods for collecting sports data, performance metrics, analytics and creating statistics have their drawbacks. For example, much of the data is entered manually. Also, non-real time video review for purposes of collecting and analyzing performance data is not efficient. Subjective and measured information is gathered via review of countless hours of game video, player data and statistics, and the like. Acquiring objective and quantifying sports RTLS/RTSS performance metrics, data, analytics and/or statistics of a player's game, practice, training and/or sporting event performances from High School, College, through the professional level is a very important and valuable asset for the player, teams, coaches, team owner, fans, fantasy sports, fantasy sports leagues, sports telecasts and the sports industry as a whole.

Therefore, there is a need in the art for a more efficient system and method for gathering comprehensive, quantitative and accurate sports data in real time and in automated fashion.

The present invention solves the problems in the prior art by enabling the real time acquisition, recording, transmittal, and processing of actual game, practice, training and/or sporting event sports performance metrics, tracking, location, speed, impact, analytics, statistics and/or data from sports players, playing surface or field and sports objects (balls, bats, equipment, etc.), game officials (referees) and the "Field of Play" using, for example, RTLS/RTSS telemetry with RF technology and video technology, which may be used to superimpose acquired performance metrics, data, analytics and/or statistics on video, for example.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention includes systems and methods for acquiring, collecting, exporting, storing, communicating and delivering sports performance metrics, data, analytics, and/or statistics from individual sports participants, entire sports teams, sports officials (referees), field of play and/or sports objects, during actual sporting events/games and/or practice events to objectively quantify, evaluate, and analyze player and team performances. The data may be collected and relayed to a base, local and/or remote computer system for further analysis or processing, such as for example, through use of algorithms, computer programs and/or applications, and through the use of an RTLS/RTSS or other RF system. The data may include player and referee biological data, including, for example, heart rate and body temperature. The systems and methods may include fixing a number of location sensors, audiovisual sensors, biological sensors, modules and telemetry modules and/or sensors on sports participants, apparel or their sports equipment and in sports and field objects.

In some embodiments, the telemetry modules and/or sensors may use ultra-wideband ("UWB") radio technology to communicate with base receivers by implementing the IEEE 802.15 or Zigbee specifications; or may use other RF technologies to communicate with the base receivers by implementing IEEE 802.11, for example. Alternatively, the telemetry module may use more conventional RF tags and/or surface acoustic wave ("SAW") tag technologies for purposes of communication with base receivers.

The sensor modules, also part of the RTLS/RTSS or other RF system of the present invention, may be incorporated into the plurality of telemetry modules and/or sensors in some embodiments. Alternatively, the sensor modules may also be deployed as separate devices which connect with the telemetry modules and/or sensors through a wireless and/or wired link. The sensors and/or tags may communicate with each other (tag-to-tag) and/or directly to the receiving devices.

At least one base receiving module may wirelessly receive the telemetry data obtained from the telemetry modules and/or sensors and forwards the collected data to a base, local and/or remote computer system. Base receiving modules may forward to the base, local or remote computer system, the Sports RTLS/RTSS RF performance metrics, data, analytics and/or statistics via a wired or wireless network or through a direct connection. The base, local and/or remote computer system may be programmed and configured for receiving, storing, processing, and exporting processed data over a network or Internet, for example, to reach end users.

The sensor modules and the telemetry modules and/or sensors may be operated to acquire, collect, store, export and deliver the data to the base receiving modules. The base, local or remote computer system may be operated to receive, store, process and export the data for providing actual performance metrics, data, analytics and/or statistical information relating to location based tracking, speed, burst, impact, movement, relative position, and conditions of individual sports participants, sports officials (referees) and/or the entire teams, playing surface, field of play and/or sports objects in real time.

It is an object of the present invention to provide a method for acquiring, collecting, communicating, processing, analyzing, recording and/or exporting actual sports players and teams' performance metrics, data, analytics and/or statistics during actual sporting events in real time for objective analysis and evaluations, and/or comparisons which would be of benefit to the Sports and Entertainment community.

A second object of the present invention is to provide systems and methods that use any form of RTLS/RTSS or other RF system for acquiring, gathering, recording and exporting actual performance metrics, data, analytics and/or statistics of training, games, practices, and/or sporting events from sports players, sports participants (embedded within, attached, or affixed to player equipment, apparel, cleats, shoes, helmet, shoulder pads, protective equipment like thigh and knee pad, gloves, etc.), game objects (balls), sports objects (embedded within, attached, affixed to goal posts, yard sticks, yard markers, other field of play equipment, etc.), game officials/referees (embedded within, attached, or affixed to referee equipment, apparel, cleats, shoes, helmet, shoulder pads, protective equipment, etc.), the actual "Field of Play" itself, sports components and practice equipment (comprised of tackling dummies, blocking sleds, hitting pads, blocking pads, and the like), and others, using various RF and sensing devices for information and/or data in conjunction with RTLS/RTSS and/or other RF wireless technology and systems in real time.

A further object of the present invention is to provide a method for acquiring, collecting, exporting, recording, analyzing and communicating performance metrics, data, analytics and/or statistics from an individual sports participants and teams during an actual sporting event, game, practice, training or other sports referenced event.

A further object of the present invention is to provide a method for acquiring, collecting, exporting, recording, analyzing and communicating performance metrics, data, analytics and/or statistics from sports participants and/or game officials (referees) of an entire team and/or teams, during an actual sporting event, game, practice, training or other sports referenced event to determine a myriad of performance data including injury recovery, analyze movements, pass, bat swing, kick glides and paths, for example.

It is yet another object of the present invention to provide a method for acquiring, collecting, exporting, recording, analyzing and communicating performance metrics, data, analytics and/or statistics from sports objects, sports field equipment and field of play, during an actual sporting event, game, practice, training or other sports referenced event.

Another object is to provide a three-dimensional telemetry collection system, including longitudinal, lateral, and height dimensions for an X-Y-Z spatial representation, including 3D, enabling a 360° degree spatial representation of the performance metrics, data, analytics and/or statistics.

It is yet another object of the present invention to synchronize real time video/visual footage of a sporting event with the received telemetry data, allowing the acquired performance metrics, data, analytics and/or statistics to be superimposed on live or recorded video telecast and transmissions, if and when desired.

A further object is to instantly acquire every sports players' real time performance metrics, data, analytics and/or statistics including, for example, player location, tracking, movement, speed, velocity, speed burst, impact (G-Force), distance traveled, forward, backward, horizontal and vertical movements, vertical leap or jumps, biological information like heart rate and body temperature, in the "Field of Play" location, and overall athletic and game official (referees) performances during a sports event.

It is another object to superimpose and/or integrate real time performance metrics, data, analytics and/or statistics onto the live or recorded video telecast and/or to assist sports officials (referees) make live real time decisions and instant replays.

It is another object to superimpose the performance metrics, data, analytics and/or statistics for use on game film for video film study or other media, formats and/or uses.

It is another object to provide real time 360° renditions of performance metrics, data, analytics, and statistical perspectives.

It is another object to provide a planar (2D) and a spatial (3D) coordinate position for performance metrics, data, analytics and/or statistics acquisition, collection, processing, exportation and recordings, and to display the processed information in a 360° performance view to assist in the training of athletes, injury recovery analysis and provide additional insights to players, coaches, scouts, and fans.

Thus, the present invention offers comprehensive and multifunctional elements for acquiring actual game performance metrics, data, analytics and/or statistics from athletes in real time.

These and other objects, features and advantages of the present invention will become more readily apparent from the attached drawings and detailed description of the preferred embodiments, which follow.

It is another object to allow the users to electronically export, import, store and/or download actual game performance metrics, data, analytics and/or statistics of the sports participants and/or teams for use with, for example, a plurality of user interfaces, video game consoles, and a plurality of system users.

BRIEF DESCRIPTION OF THE DRAWINGS

The invention will be further understood, by way of example, with reference to the accompanying drawings, in which:

FIG. 4 is an exemplary statistical report displaying representative data combining sports record statistics, including performance metrics, data, analytics and/or statistics in accordance with one embodiment of the present invention;

FIGS. 8A, 8B, and 8C are an exemplary display of sports statistical information, portions of which contain performance metrics, data, analytics and/or statistics which may be produced in accordance with one embodiment of the present invention;

FIGS. 9A, 9B, and 9C illustrate exemplary displays of sports statistical information, portions of which contain performance metrics, data, analytics and/or statistics which may be produced in accordance with one embodiment of the present invention;

FIGS. 10A and 10B illustrate exemplary displays of sports statistical information, portions of which contain performance metrics, data, analytics and/or statistics which may be produced by the present invention;

FIGS. 11A and 11B are an exemplary display of sports statistical information, portions of which contain performance metrics, data, analytics and/or statistics which may be produced in accordance with one embodiment of the present invention;

FIG. 12 is an exemplary display of sports statistical information, portions of which contain performance metrics, data, analytics and/or statistics which may be produced in accordance with one embodiment of the present invention;

DETAILED DESCRIPTION OF THE PREFERRED EMBODIMENTS

Figure 1:
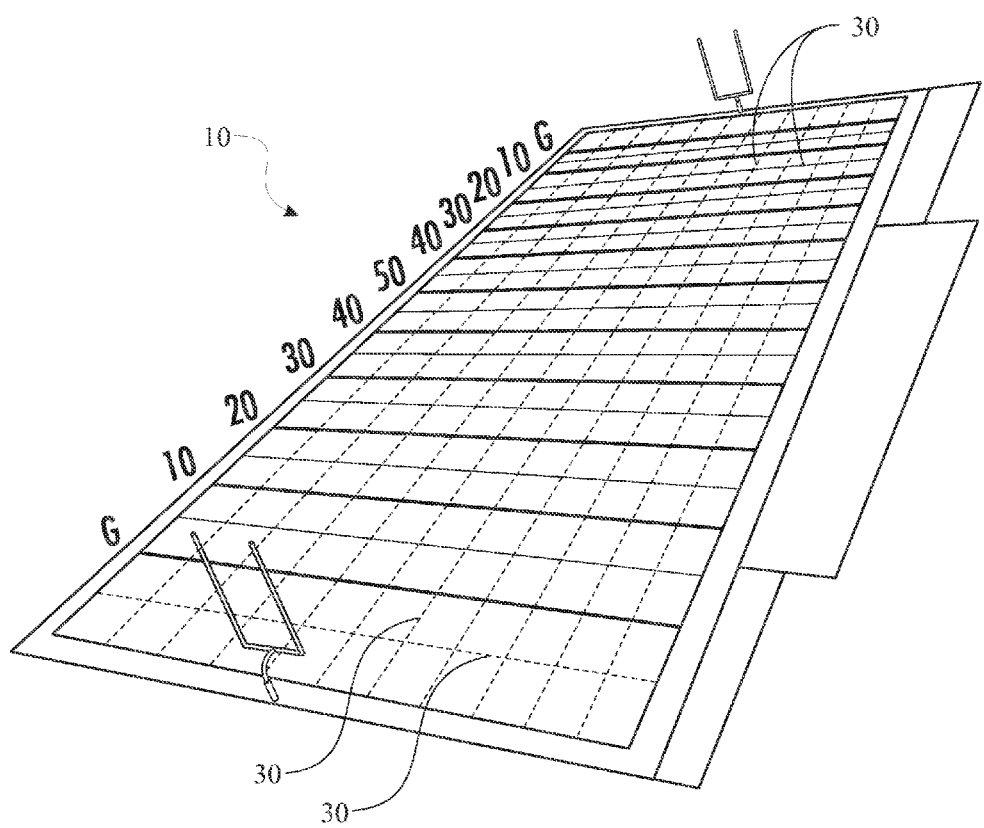
FIG. 1 is a diagram of an American football playing field with a simulated recognition wireless coverage area grid indicated by dotted lines representing an area of coverage using a wireless array, in accordance with one embodiment of the present invention.

Shown throughout the drawings, the present invention is generally directed to a method for acquiring, collecting, processing, exporting and recording sports performance metrics, data, analytics and/or statistics, during an actual sporting event in real-time. FIG. 1 is a diagram of an American football playing field 10 with a simulated recognition wireless coverage area grid indicated by dotted lines 30 representing an area of coverage using a wireless array, in accordance with one embodiment of the present invention.

The method in accordance with one embodiment includes attaching sensor modules and telemetry modules and/or sensors on movable (e.g., players, referees, a ball, yard sticks, etc.) and stationary (e.g., goal posts, zone marker, etc.) objects or sources. These sources may include individual sports events participants, participants of an entire team, teams, game officials (referees), field of play, field equipment, playing surface and/or sports objects. Sports objects may include a football, a baseball, a hockey puck, boxing gloves, any glove and other movable objects employed in sports events or competition. The sensor modules may include sensors for measuring performance data and location. For example, the sensor modules may measure data related to a sports participant, a player or game official (referee, umpire, etc.), for example. The measured data may include acceleration, location, tracking, movement, speed, velocity, speed burst, impact (G-Force), distance traveled, direction and range of movement, vertical leap or jumps, biological information (heart rate, body temperature, etc.), in the "Field of Play" location, and overall athletic performance during a game or sports event (including practice session). The location data may include coordinates to indicate player position, for example. A telemetry module, telemetry device, and/or sensor may include an identifying device (e.g., RF ID tags or the like). In some embodiments the telemetry modules may integrate sensors. The term "sports event" is not limited to actual sporting event in a regular, post season or championship games but also includes practice sessions and training sessions.

The data may be collected and relayed to a base, local and/or a remote computer system for further analysis or processing, such as for example, through use of algorithms, computer programs and/or applications, and through the use of an RTLS/RTSS or other RF system. The data may include player and referee biological data, including, for example, heart rate and body temperature. The systems and methods may include fixing a plurality of location sensors, audiovisual sensors, biological sensors, modules and telemetry modules and/or sensors on sports participants, apparel or their sports equipment and in sports and field objects.

In another example, the present invention, includes a method for collecting sports data, performance metrics, data, analytics and/or statistics and includes the steps of receiving, from one or more telemetry modules mounted, affixed, or embedded on at least one sports participant, first signals carrying data corresponding relative position, identification, movement, speed, velocity, impact, position, biological data or condition of at least one sports participant; receiving, from one or more telemetry modules mounted, affixed, or embedded in a sports object, second signals carrying data corresponding to relative position, identification, movement, speed, velocity, impact, position or condition of the sports object; and processing the received first and second signals to calculate position information or movement information of a sports object or a sports participant in relation to a playing surface of a sports event.

In yet another example, the system of the present invention is further configured to receive from one or a plurality of telemetry modules and/or sensors mounted, affixed, or embedded in an object placed in a location where the sports event takes place, a third signal carrying data corresponding to the proximity of the sports object or sports participant to the object placed in a location where the sports event takes place, and includes a plurality of signals carrying data corresponding to relative position, identification, movement, speed, velocity, impact, position, biological data or condition of at least one sports participant, team and/or sports official (referee).

Identifying devices may be used to identify a specific individual participant, participants of an entire team, teams, game officials (referees), field of play, field equipment, and/or game object(s). Measuring devices acquire and collect performance metrics, data, analytics and/or statistics and data in real time. The collected data can be transmitted via a wireless link to a base, local and/or remote computer system having data collection software, or to a database. Telemetry modules and/or sensors may include hardware and/or software which facilitate the transmission to at least one receiver, connected to the base, local and/or remote computer system, of the data measured at moving and stationary sources on a playing field 10. It is to be understood that the sources and playing field 10 is described generally and the method may be incorporated into any sports event.

The acquired real time performance metrics, data, analytics and/or statistics received by the base, local and/or remote computer system can be used instantly in real time for sidelines, coaches, fans, remote viewers or others for evaluation and analysis by further transmitting the processed data to end user devices. In one embodiment communications modules are used for communicating a plurality of performance metrics, data, analytics and/or statistics in real time to at least one of an entity, server and/or system hosting a fantasy sports application, a software engine, or application, a broadcasting station or Internet website, which may then be transmitted, exported, imported, received, stored or downloaded for use by users and/or systems. The end user devices may include computers (fixed or portable), tablets, smart phones, PDAs, mobile technologies, etc. The processing by the base, local and/or remote computer system may produce tractable, superimposed and/or integrated telemetry data onto the live or recorded video broadcast, or incorporated into instant replays of the live game, practice, training and sporting event. Also, the telemetry data processed by the base, local and/or remote computer system may be used as sports statistics, analytics, data and/or as metrics in the context of Fantasy Sports; and may be directly transmitted to fans at the stadium or homes, websites, fantasy sports leagues, computers, PDAs, and other mobile technologies (for example, by interactively communicating the performance metrics, data, analytics and/or statistics to a plurality of users using multiple user interfaces), or may be exported, transmitted, imported, downloaded and used by electronic video sports games to replay, actual and/or simulated player game performances. The end user devices may be configured to continuously track the location, speed, and other data on the playing field 10, of each source, to receive data from measuring devices, and to associate the data with the originating source.

In another embodiment, the present invention may include a remote processing module configured to use the plurality of data to determine a plurality of performance data, analytics, statistics and/or metrics for the sports participant(s), team(s), sports official (referees), field of play, field equipment, and/or sports equipment in real time. The data may be acquired, captured, collected and/or relayed through the use of an RTLS/RTSS or other RF system to a base, local and/or remote computer system in real time for further analysis or processing, such as for example, through use of algorithms, computer programs and/or applications.

In an alternative embodiment, end user devices may receive the telemetry data directly from the telemetry module or through a network connection that streams the telemetry data to the end user devices, so that the processing of the telemetry data may be conducted locally and/or at the end user device. The data processed at the end user devices may be exported.

The system of the present invention may present the performance metric, data, analytics and statistics and other data via RF wireless applications and transmissions to and from to a mobile device, computer, or smart phone, for example. Performance metrics, data, analytics and/or statistics can be played back at a later time and superimposed and/or integrated onto video live and/or for "Film Study" sessions by teams, coaches, players, scouts and for Fantasy Football to objectively and quantitatively analyze data related to plays, player speed, velocity, speed burst, forward, backward, horizontal & vertical movement, location, match-ups, line ups and athletic performance to name a few. Alternately, the overlaid or superimposed information may be used by and referenced for sportscasters and sports analysts. The performance metrics, data, analytics and/or statistics acquired and captured by the system can be exported and/or recorded into standard relational databases, for example an SQL Server based database, and/or can be exported in real time as reports, video, encoded data, superimposed data and/or integrated and represented visual graphs. The following is an example of the performance metrics, data, analytics and/or statistics for American Football which may be provided by the present invention in real time:

| Player | Ball | Officials or Referees |
|---|---|---|
| Field location | Velocity | Ball Spotting and Marking |
| Tracking of horizontal/vertical movements | Pass speed | Player and Ball Field location |
| Game speed | Rotation | Field measurements |
| Burst speed | Impact (G-Force) | First down |
| Burst to ball | Height | Touchdown |
| Burst to gap | Angle | Fumbles |
| Impact | | Referee To Play Positioning |
| Tackle and blocking impact (G-force) | | Angle to ball |
| Yards after impact | | Angle to player |
| Speed after impact | | Play Perspective |
| Lateral and vertical speed | | Penalty Calling |
| Vertical leap height | | Ball Marking |
| Biological information | | Tracking of horizontal/vertical movements |
| Heart rate | | Game speed |
| Body temperature | | Lateral and vertical speed |
| | | Biological information |
| | | Heart rate |
| | | Body temperature |

The system of the present invention may superimpose and/or integrate real time performance metrics, data, analytics and/or statistics onto the live or recorded video telecast and may be used to assist sports officials (referees, umpires, etc.) to make live decisions and decisions based on instant replays. Also, the system of the present invention may superimpose the performance metrics, data, analytics and/or statistics to facilitate game film (for video film study, etc.) or other media, formats and/or uses.

In one embodiment of the present invention, radio frequency (RF) devices comprised of tags, sensors and/or chips, for example, may serve as the identifying devices. A source may carry a fixed or variable radio frequency chip encoded with identifying data which may be correlated to the individual participants, parts or objects. The Sports telemetry system of the present invention may include a Real-Time Location System (RTLS) and Real-Time Sensing System (RTSS) with RF technology. The RF technology may include active and/or passive RFID tags and an RF wireless array system as a receiver. The RF technology in the RTLS and RTSS may be comprised of and include UWB technology (e.g., IEEE 802.15), WLAN technology (e.g., IEEE 802.11), SAW RFID positioning system technology, GPS Technology, etc. The sensors and/or tags may communicate directly with each other and/or relay telemetry data directly to base receiving RF device(s), base receivers, and or base, local and/or remote computer system. The base receivers may forward the telemetry data to a base, local and/or remote computer system either through a wireless link, optical link, hard wired link, PAN, LAN, WAN or through any other network means. Alternatively the telemetry data, metrics analytics and/or statistics may be forwarded to end user devices, laptops, mobile devices, etc., either directly or through a network.

RF electronic directional signaling devices, positioned at multiple locations proximate to the playing field 10 may be used to locate the RF tags, sensors and/or chips by triangulation. A planar (three dimensional) X-Y-Z location, for each source may be delivered to the receiving means and handled as set forth above.

A comprehensive system using RF technologies comprised of UWB, ZigBee, Wi-Fi, GPS data system can be utilized as described above. The playing field 10 can be mapped via RF technologies, comprised of UWB, ZigBee, Wi-Fi, 802.11 and/or GPS coordinates. Further, a spatial (three-dimensional) x, y, z data acquisition system can be utilized for obtaining telemetry data (e.g., spatial, performance) for the players, sports officials, field of play, sports objects as playing pieces, sports field equipment, sports training equipment and the like.

Each tag's physical location on the game field 10 can be determined using a variety of means. One means is using common RTLS with UWB technology. Other means include integrating multiple RF technologies comprised of ZigBee, 802.11, GPS technology, triangulation, and the like with UWB, for example. Two (four for 3D) or more RF readers/antennae in a RF base array can precisely determine the RFID tag's range from each reader and its location using RTLS in real time. The readers/antennae may be interconnected using RF, Wireless and/or a WAN, PAN or LAN, or Ethernet, for example, to provide a network communication infrastructure for the computers and servers. Active and passive RFID Tags may be employed. The active tags (RFID) may have a two-way communication function, which allows the base, local and/or remote computer system or to each other to dynamically manage the tags; vary update rates; and send self-identification and telemetry data.

The active tags may employ dual-radio architecture or a variance. In one embodiment, active tags transmit radio pulses, which are used to determine precise two-dimensional or three-dimensional location and a conventional bi-directional radio, which is used as a control and telemetry channel with a tag update rate. The tag, sensors and/or chips may have intercommunication with each other to relay information to themselves and/or the receiving system.

Continuing with the telemetry system, tags and sensing devices may be disposed upon the participants, game officials (referees), as well as various game objects. In the exemplary embodiment, multiple tags/sensors could be embedded, attached and/or affixed in the participants equipment, including shoulder pads, chest pads, helmets, shoes, and the like, as well as game objects 68, including a football, sideline markers, down markers 80, and the like. Data, movement, location, speed, acceleration, burst, impact, location and the like, can be acquired, captured and provided to the system. Each grouping of multiple sensors whether embedded, attached, affixed or not can be configured into a single logical entity and/or groups that may be disseminated by the base receiving system and/or base, local and/or remote computer system. The receiving system and network can include an identification reference, including performance and reference information for each individual sensor and location. The system can group players in any desired manner by field location, sports position (i.e. Linebackers, etc.) and/or teams to track movements, speed and other performance data, analytics, statistics and/or metrics.

The sensor modules may be in signal communication with the telemetry modules and/or sensors via either a wired or a wireless interface. The data handling means and the telemetry means may be operated to acquire, collect, store and export performance metrics, data, analytics and/or statistics and deliver the data to the end user devices or equipment in multiple medias and/or formats. The data handling means can include video telecast equipment for superimposing the performance metrics, data, analytics and/or statistics in real time and/or post-event (recorded).

One or more base receivers may be connected via RF, directly or electronically connected to the base, local and/or remote computer system, which may in turn process the telemetry data for forwarding to end user devices. The performance metrics, data, analytics and/or statistics captured by the sensors and/or system can be recorded into standard relational databases SQL Server, and/or other formats and can be exported in real time to reports, video, for superimposing and/or integration into video, or as represented graphs of sports performance metrics, data, analytics and/or statistics. The base, local and/or remote computer system may be operated to receive, store, export and process the sports data for providing performance metrics, data, analytics and/or statistical information relating to Real-Time Location System (RTLS) based tracking, movement, relative position, and conditions of individual sports participants, the entire teams, game officials (referees), sports field of play, sports field equipment and sports objects. In one embodiment, the step of displaying progressive movement comprises as a sequence of three-dimensional images.

The Sports RTLS/RTSS or other RF Telemetry system and base, local and/or remote computer system of the present invention can be programmed and configured to receive the stream of performance metrics, data, analytics and/or statistics to transmit and store the data retaining periodic time stamps and identify RF tags. The base, local and/or remote computer system can be further programmed and configured to sort and present the data and/or analytics according selected mode and criteria. For example, the computer may be adapted to display a series of location data points, for each source, indicating the progressive movement (tracking) of each source, by a colored solid or dotted line or other symbols on the display thereby graphically tracking movement, speed and other performance metrics, data, analytics and/or statistics. In this manner, the course of movement of each individual participant and/or a game object (ball) may be graphically displayed. Turning to the example of football, the method of the present invention may display the course of action in a particular football play, as a visual aid for teams, coaching or players, and for Fantasy Sports, websites, electronic video displays, and fans, sports analysts, sports, Television (TV), premium channel shows, commercial and entertainment uses. Fantasy Sports team owners and others will obtain an objective, unique and multiple perspectives from different angles with insightful, informative and invaluable performance metrics, data, analytics and/or statistical information to quantify the players and their performance. Images may be employed to display a two or three dimensional dynamic view of players on a playing field. The data may also be utilized to form profiles of particular players, for leagues, teams, coaching, Fantasy Sports, electronic video games, websites, mobile devices, etc.

Figure 2:
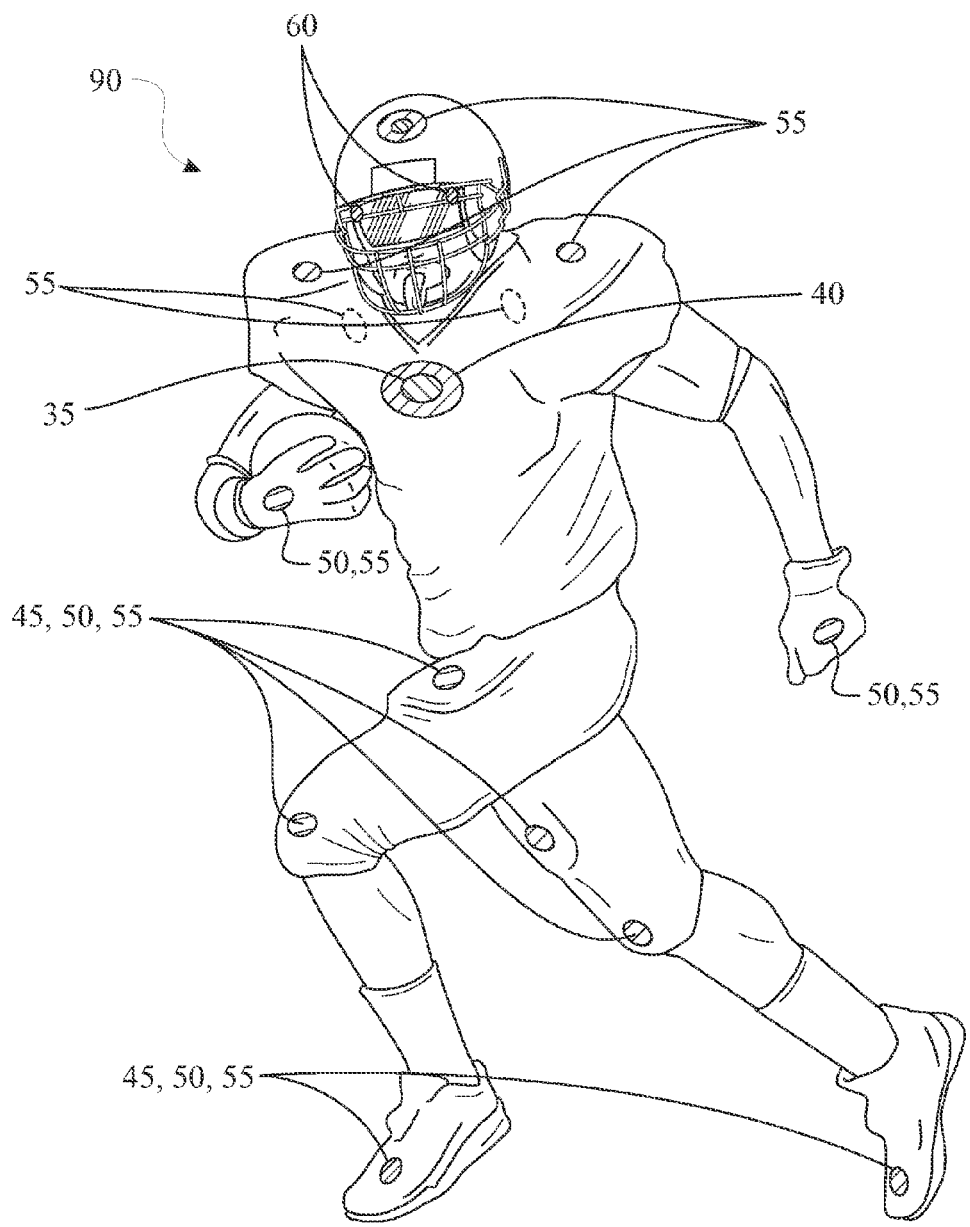
FIG. 2 is a drawing of an equipped American football player with various exemplary data handling and telemetry devices fixed to the equipment, in accordance with one embodiment of the present invention.

Measuring devices or sensor modules, as shown in FIG. 2, may include RTLS/RTSS or other RF system devices with a heart rate monitor 35, a body temperature probe 40, a conventional pedometer 45, a conventional accelerometer 50, and a conventional impact sensor 55 and camera 60. Alternatively, multifunctional sensors which can perform all the aforementioned functions and may be attached or embedded, wherein each of the telemetry and/or sensor modules may connect electronically with each other and to the system using RTLS/RTSS and/or RF technologies.

FIG. 2 shows a heart rate monitor 35 and temperature probe 40 on the chest of a football player; a pedometer 45; an accelerometer 50; impact sensors 55 on the feet, shoes and legs of the football player; impact sensors 55 on the helmet, shoulder pads (top, front, and rear), and thigh pads; and a camera 60 on the helmet. The football player shows a accelerometer 50 and impact sensor 55 on his gloves. The present invention may have one or more of the measuring devices as depicted or multiple measuring devices in multiple locations for better sensory acquisition, distribution and redundancy of sensory or telemetry devices. It will be appreciated that each measuring device may include a telemetry device (or vice versa) of each measuring device may be connected to a shared telemetry device. In one embodiment, the telemetry device or devices transmit a time stamped data stream tagged with a source identity, to the base receiver(s). The base receivers are preferably configured to deliver the data stream to the computer system. Alternatively, multifunctional sensors which can perform all the aforementioned functions of RTLS/RTSS may be attached or embedded. In one embodiment, each of the sensor modules may connect electronically and/or via a wireless connection using Radio Frequencies (RF), to the telemetry module and to the base, local and/or remote computer system and/or end user devices. The camera 60 may provide streaming video of the view from the helmet of the player and can be linked to the performance metrics, data, analytics and/or statistics of the players' from various perspectives, for example from the "field of view" from the video (player's) camera. And/or from other players on the field.

The player video system may include a video eye-tracking system that can provide a view of the player's field of view as well as the player's eyes and eye movement. The eye-tracking camera(s) may be located in front center of the helmet. The player eye-tracking system will give a coach and fans the visual perspective of what the player is actually seeing. It is understood the eye tracking system can be incorporated into the RTLS/RSS system to integrate the sports participant's view with the real time performance metrics, data, analytics and/or statistics, by for example, by use of a multiplexer. The monitoring devices can be individually incorporated or at least a portion of the sensors being integrated into a single sensing device with multiple functions in multiple areas as desired.

The eye tracking system may include an RF/wireless video camera. One camera may face the player's eyes to track sports participant's eyes and its movement. This camera may include a small RF/wireless video camera on the inside of the facemask mounted and/or near the forehead facing the player's eyes. The other camera(s) may point in the direction of the players field of view to capture at what he looks at and may include two small RF/wireless video cameras recessed on the inside of the helmet or facemask facing forward towards the sports participant's field of view. The eye tracking system may include one or more of the eye tracking camera products offered by Applied Science Laboratories, for example. The players' video may have the performance data, analytics, statistics and metrics superimposed as to give the viewer the real time sports data from the players' field of view and perspective. Additionally, any and all of the player videos can contain their "player vision" from their perspective and location in real time with the sports performance metrics, data, analytics and/or statistics superimposed on the video, if so desired.

Figure 3:
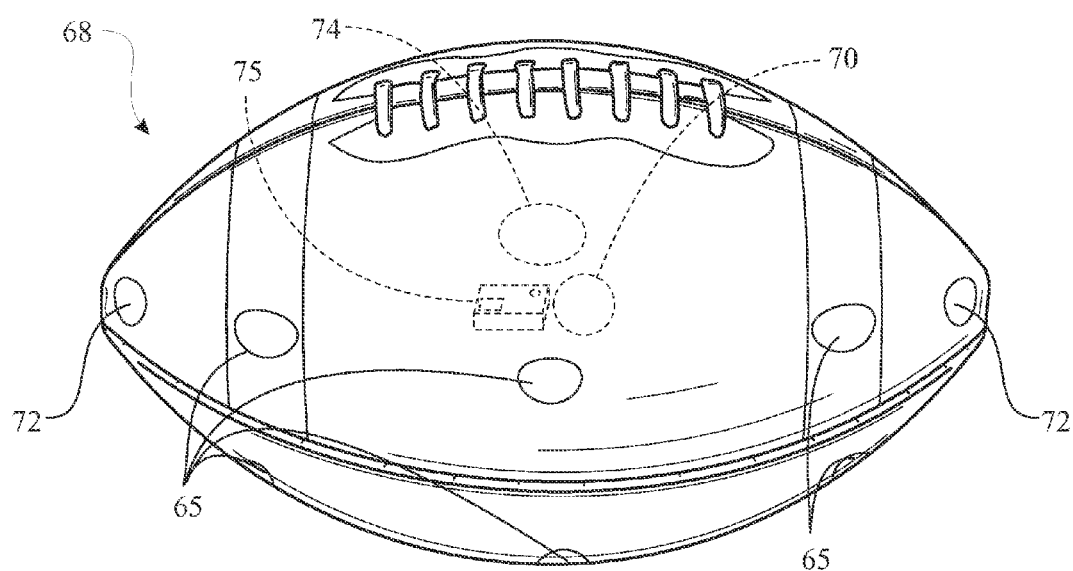
FIG. 3 is a drawing of a sports object, an American football including various sensors and telemetry devices, in accordance with one embodiment of the present invention.

As indicated, sources may comprise an individual sports event participant, the participants of an entire team, multiple teams, field of play and/or a game object. FIG. 3 depicts an exemplary game object, namely a football. FIG. 3 illustrates multiple identity devices, in the form of location sensors 65 including UWB tags/sensors, RF, wireless, GPS sensors, and the like), a gyro sensor 70, an impact sensor 72, a transmitter 75, and an RF tag 74. The football may be provided with multiple identity devices to ensure proper real time tracking recognition during movement involving relatively high speed, rotation and relatively great displacement from the playing field 10, both of which are common occurrences. Alternatively, multifunctional sensors which can perform all the aforementioned functions of RTLS/RTSS may be embedded. In one embodiment, each of the sensor modules may connect electronically and/or via wireless communications using Radio Frequencies (RF) to the telemetry module and to the base, local and/or remote computer system and/or end user devices. The current invention adds greater accuracy to marking the game ball, sports participants, location, velocity, impact, speed and traveled area. It is understood the monitoring devices can also be individually incorporated or at least a portion of the sensors being integrated into a single sensing device with multiple functions in multiple areas as desired.

The base, local and/or remote computer system and/or end user devices can be programmed and configured to receive the stream of telemetry data and to store and export the data retaining periodic time stamps and identify tags. The computer can be further programmed and configured to sort and present the data according selected mode and criteria. For example, the computer system may be adapted to display a series of location data points, for each and any source, indicating speed, velocity impact and tracking the progressive movement of each source in real time, by a colored solid, dashed line or any other graphic on the display. In this manner, the course of movement of each individual participant, multiple participants and a ball may be displayed in relation to a field location. Turning to the example of football, the method of the present invention may display the course of action in a particular football play, as a visual aid for coaching, sports, Fantasy Sports (e.g., Fantasy Football) and/or for fan entertainment. This may include commercial, entertainment and historical value. Conventional software may be employed to display a three dimensional dynamic view of players on a playing field 10 or for producing reports. The performance metrics, data, analytics and/or statistics may also be utilized to form profiles of particular players, for fantasy sports, sports leagues, teams, coaching, player, film study, websites, Internet and sports entertainment and commercial purposes.

Figure 4:
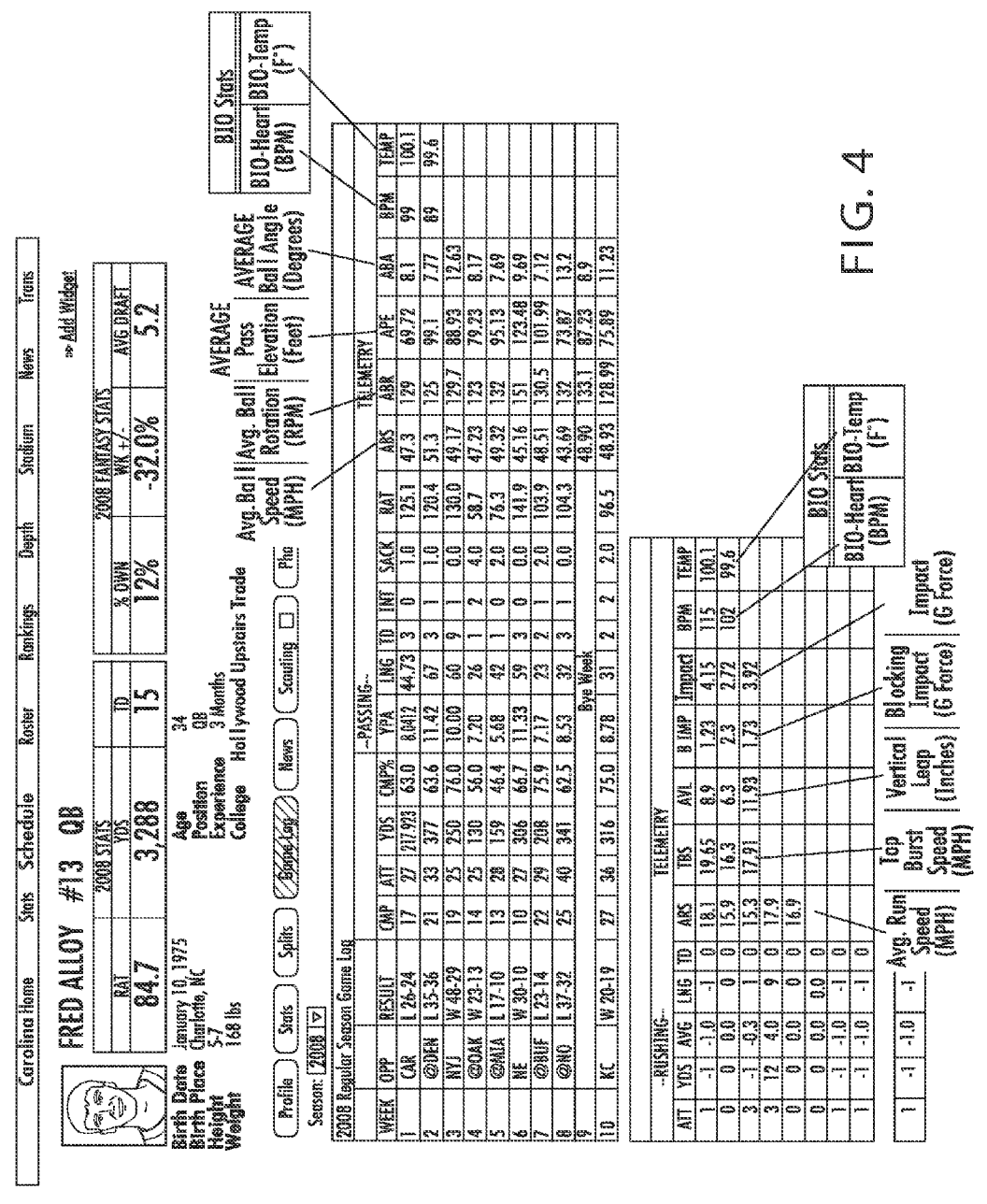

Stored, transmitted, exported and/or imported data may be presented in visual, report or chart form, as depicted in FIG. 4, which combines conventional football game performance metrics, data, analytics and/or statistics with data provided by the method of the present invention. The exemplary displayed data is selected from one source, namely an individual participant named Fred Alloy. The rows each represent statistics and data collected during a particular week. The columns extending from left to right report conventional passing statistics and the far left columns display data that may be collected by the application of the method of the present invention. In the exemplary embodiment, the column labeled ABS reports the average speed of the ball, taken from the series of location data points identified for the ball, during actual play. The column labeled ABR reflects ball rotation derived from output of the gyro sensor 70. The column labeled APE reports average pass elevation. In addition, new columns may be created to show actual speed, burst, impact and other performance metrics, data, analytics and/or statistics. The column labeled ABA reports average ball angle, BPM reports participant's heart rate, and TEMP reports body temperature. Columns may be created to show actual and precise metrics, data, analytics and/or statistics. Stored and/or exported data may also be presented in visual or report form.

Likewise, the lower section of the chart reports rushing statistics, with conventional statistics in the left five columns and data derived from the method of the present invention displayed in the columns on the right. The column labeled ARS reports average run speed. The column labeled TBS reports top burst speed. The column labeled AVL reports average vertical leap. The column labeled B IMP reports blocking impact. The column labeled IMPACT reports intensity of impact. The column labeled BPM reports heart rate. The column labeled TEMP reports body temperature. Columns may be created to show actual and precise speed, burst, impact and other metrics, data, analytics and/or statistics.

Figure 5:
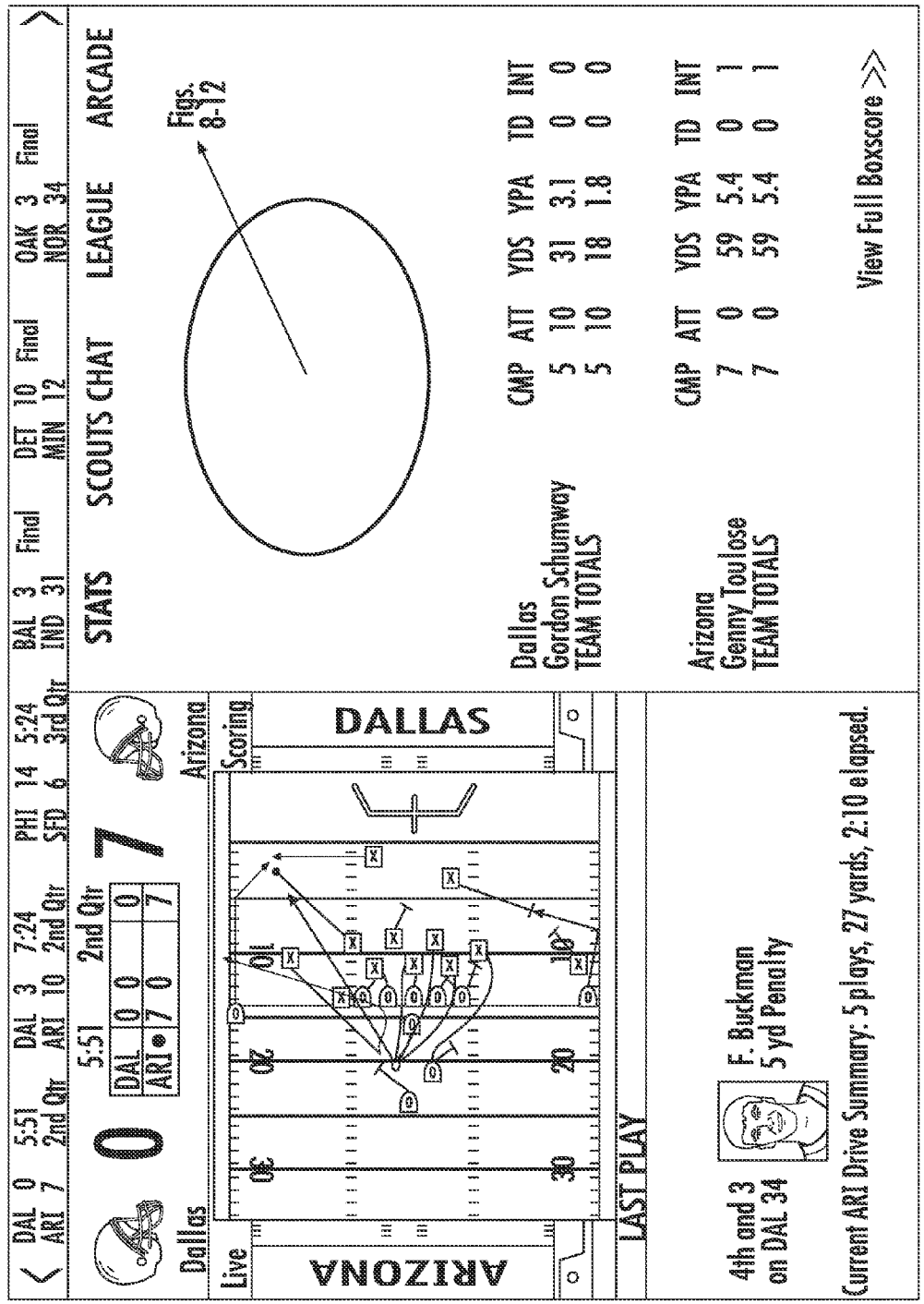
FIG. 5 is an exemplary representation of a contemporaneous Internet based sports event status display indicating an area for presentation of video output in real time in accordance with one embodiment of the present invention.
Figure 6:
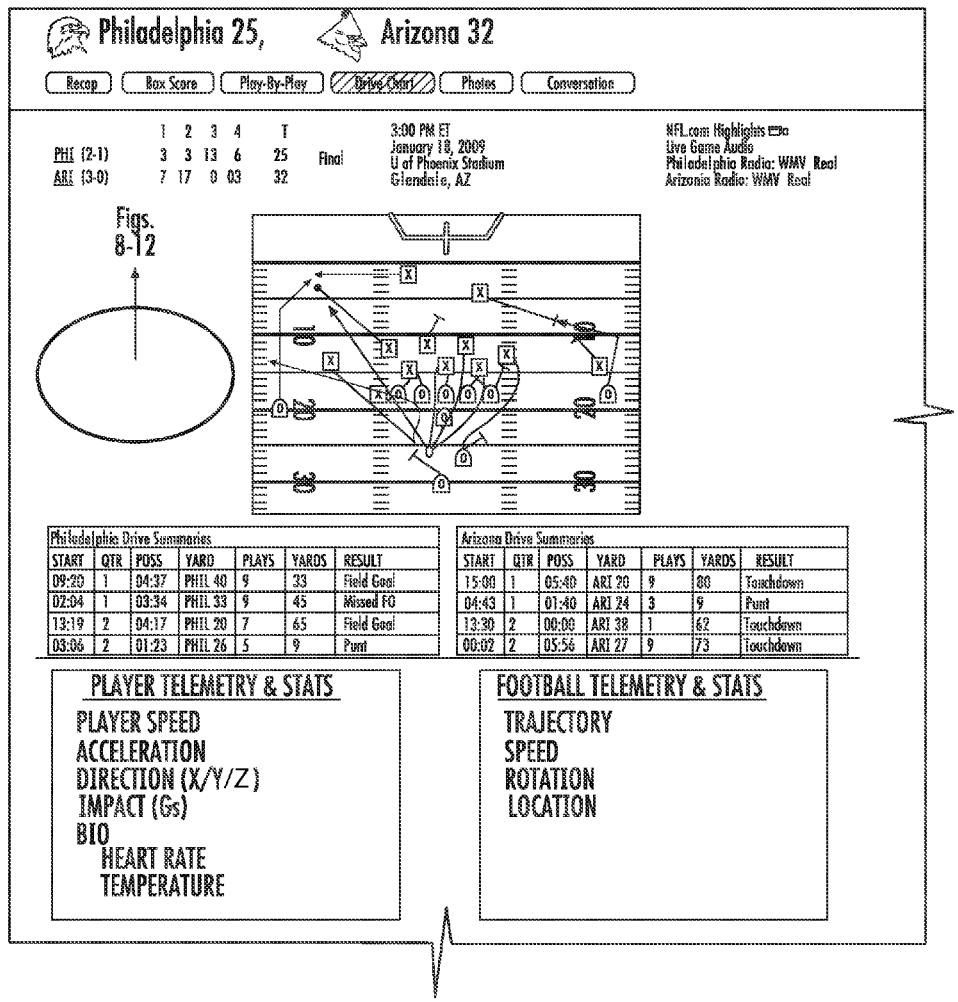
FIG. 6 is an alternative representation of a contemporaneous Internet based sports event status display indicating an area for presentation of video output in real time in accordance with one embodiment of the present invention.

The data, which is collected, processed, and presented, according to the method of the present invention, may be utilized as the basis for player profiles, match-ups and play scenarios in live game and post game analysis by leagues, teams, coaches, TV broadcasting, fantasy sports, and the like. FIG. 5 shows an exemplary display screen 501, which may appear on a computer in fantasy game play, such as fantasy football. A band, on the upper portion of the screen, displays scores of league football games. The left portion of the screen includes a depiction of a football field with players designated and routes of movement indicated by path lines. The right portion of the screen includes an ellipse to indicate an area for displaying performance metrics, data, analytics and/or statistics generated according to the method of the present invention. A similar screen 601 is depicted in FIG. 6 having an ellipse, in the left portion to indicate an area for display of performance metrics, data, analytics and/or statistics generated according to the method of the present invention.

Figure 7:
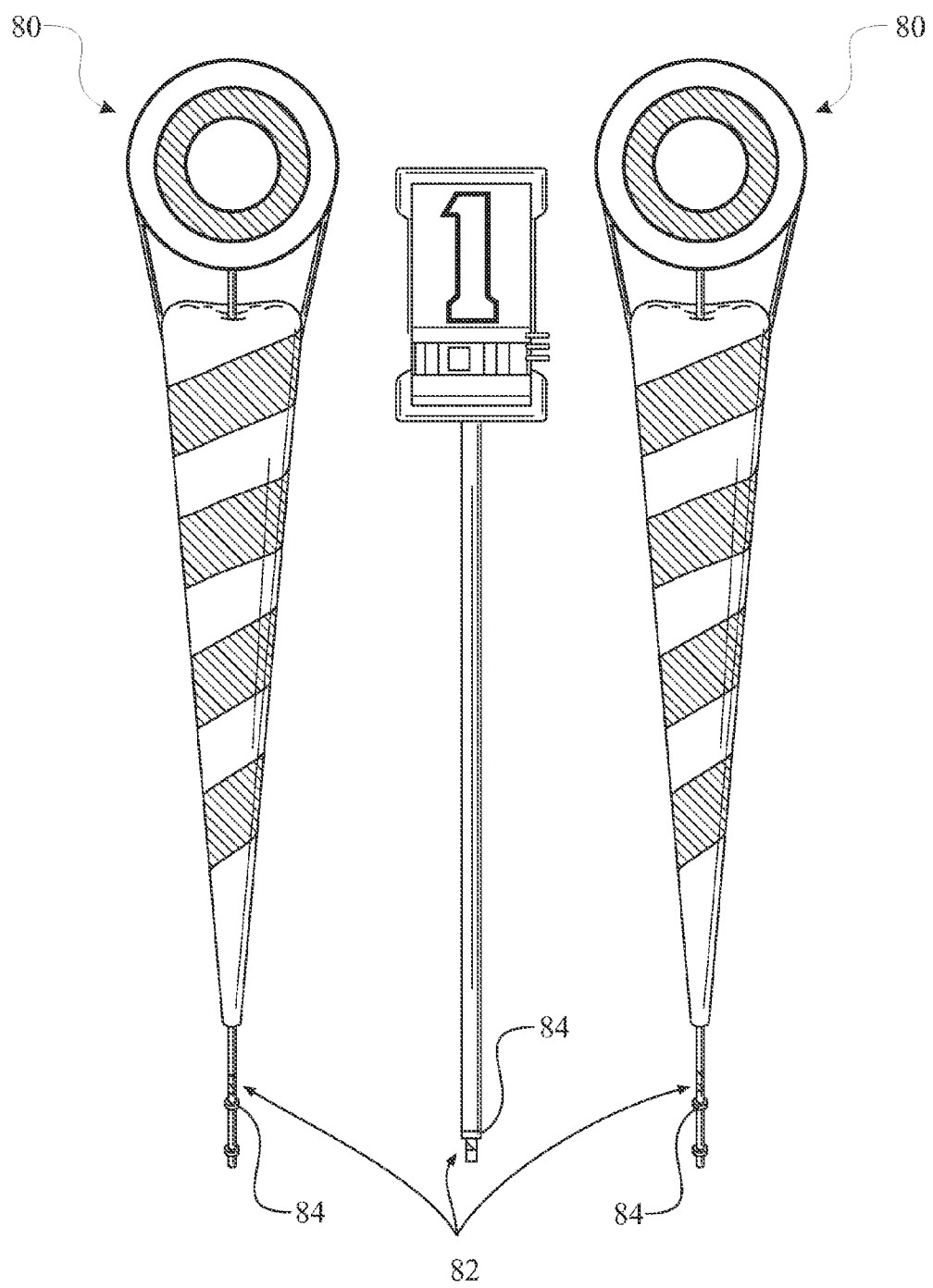
FIG. 7 is a drawing of yardage and down marking field equipment, for an American football game indicating the fixing of data handling and telemetry devices in accordance with one embodiment of the present invention.

The method of the present invention may also include object sources other than the ball, sports object or other projectile used in play. FIG. 7 shows a set of American football down markers 80 with identification devices, comprised of RF (radio frequency) tags/sensors/chips 82 fixed on the objects. The down markers 80 can include a telemetry sensor 84 for identifying the location of the markers 80. It will be appreciated that the receiving means may include means to locate the radio frequency chips by triangulation and that each chip preferably includes encoded identification data, which may be communicated to the receiver and input to the computer, as a tag on the location data. The processing may include comparing the ball location to the down markers 80 and completion of an arithmetic operation to compute and report the distance required to reach a first down or touchdown, in a football game, for example. Additional data devices can be incorporated comprised of an identifier recognizing the down (or similar reference), and the like. Alternatively, multifunctional sensors which can perform all the aforementioned functions of RTLS/RTSS may be attached or embedded. In one embodiment, each of the sensor modules may connect electronically and/or via wireless communications using Radio Frequencies (RF) to the telemetry module and to the base, local and/or remote computer system and/or end user devices.

It will be appreciated that the technique may be incorporated into other sports to provide data for computing relevant parameters. The method of the present invention may be readily adapted for use in other sports, for example hockey, soccer, baseball, basketball, boxing, ultimate fighting, mixed martial arts or golf, for example.

In addition, the method of the present invention may serve commercial, military, law enforcement and/or industrial applications where continuous monitoring of location and movement for individuals and objects and/or performance metrics, data, analytics and/or statistics are required.

FIGS. 8A, 8B, and 8C show three segments of an elongate chart intended to be read as a group of linear rows of data showing data, in columns, for each row.

The data pertains to a football quarterback and each row of data represents a single play and illustrates the variety of data, which may be collected and presented using the system and method of the present invention. Similarly, FIGS. 9A, 9B, and 9C show three segments of an elongate chart intended to be read as a group of linear rows of data showing data, in columns, for each row. The data pertains to a football wide receiver. FIGS. 10A and 10B illustrate data pertaining to a football defensive player. FIGS. 11A and 11B illustrate data pertaining to a football punter. Like data can be collected for other players and may be presented in a similar manner. Additional data can be provided with the incorporation of respective sensing and telemetry devices. FIG. 12 illustrates a printed display of the data received from the object sources comprising the down marker equipment 80.

Figure 13:
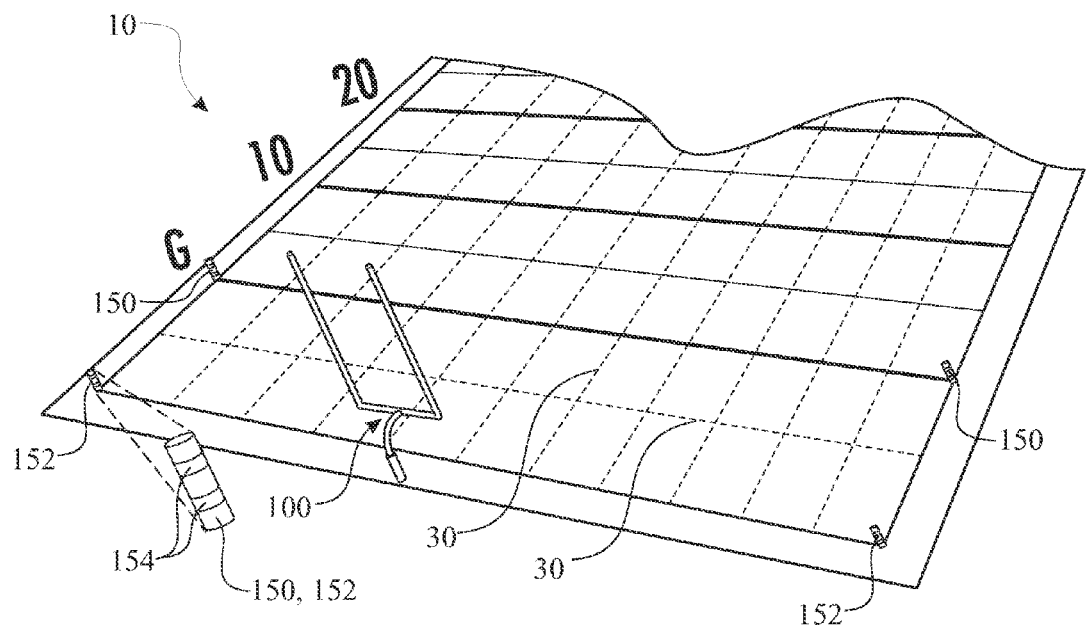
FIG. 13 is an isometric view of a section of a field of play illustrating game location tags in accordance with one embodiment of the present invention.

A portioned view of the playing field 10 is presented in FIG. 13, illustrating an exemplary inclusion of field deployed tags 150, 152, 153 and 154. These sensors accurately determine if a ball crosses the goal line for scoring points, a touchdown, first down, goal posts, and field position, for example. Alternatively, multifunctional sensors which can perform all the aforementioned functions of RTLS/RTSS may be attached or embedded. In one embodiment, each of the sensor modules may connect electronically and/or via wireless communication using Radio Frequencies (RF) to the telemetry module and to the base, local and/or remote computer system and/or end user devices.

In the illustration, a pair of goal line markers 150 is positioned at each sideline to goal line intersection. The goal line marker 150 includes at least one line tags 154 sensing a position of a player 90, a game piece 68, game officials/ referees (not shown) and the like. The placement of two or more tag sensing posts 150, 152 is arranged to additionally monitor the sidelines as well as the respective yard markers, goal line, and end zone. Other reference sensors can be integrated into various equipment associated with the game or playing field 10, a goal post assembly 100 (FIG. 14) and sideline markers 80. Alternatively, multifunctional sensors which can perform all the aforementioned functions of RTLS/RTSS may be attached or embedded. In one embodiment, each of the sensor modules may connect electronically and/or via wireless communication using Radio Frequencies (RF) to the telemetry module and to the base, local and/or remote computer system and/or end user devices.

Figure 14:
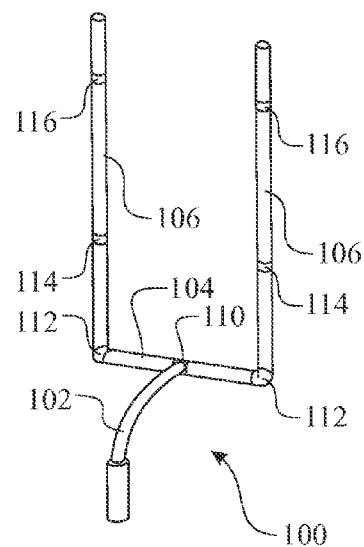
FIG. 14 is an isometric view of a field goal post being an exemplary embodiment illustrating game component monitoring tags in accordance with one embodiment of the present invention.

The goal post assembly 100 may be formed having a goal post support 102, which supports a goal post horizontal member 104, which in turn supports a pair of spaced goal post uprights 106 as detailed in FIG. 14. It is understood the shape of the goal post assembly 100 can vary. The goal post assembly 100 can include a series of tags being positioned at various locations on the goal post assembly 100. A first tag is referred to as a base central tag 110, being located proximate a center of the goal post horizontal member 104. A pair of tags, referred to as goal post corner tags 112, may be integrated into the goal post assembly 100, each goal post corner tags 112 being located proximate an intersection formed between the goal post horizontal member 104 and each goal post upright 106. Additional tags can be integrated between the base central tag 110 and each goal post corner tags 112. A goal post upright lower tags 114 and a goal post upright upper tags 116 can be added to the goal post upright 106, wherein the goal post upright lower tags 114 is located along a lower portion of the goal post upright 106 and the goal post upright upper tags 116 is located along an upper portion of the goal post upright 106. Alternatively, multifunctional sensors which can perform all the aforementioned functions of RTLS/RTSS may be attached or embedded. In one embodiment, the sensor modules may connect electronically and/or via wireless communication using Radio Frequencies (RF) to the telemetry module and to the base, local and/or remote computer system and/or end user devices to detect and identify when a game object (ball) crosses the field goal post upright 106, for scoring a field goal or extra point.

Figure 15:
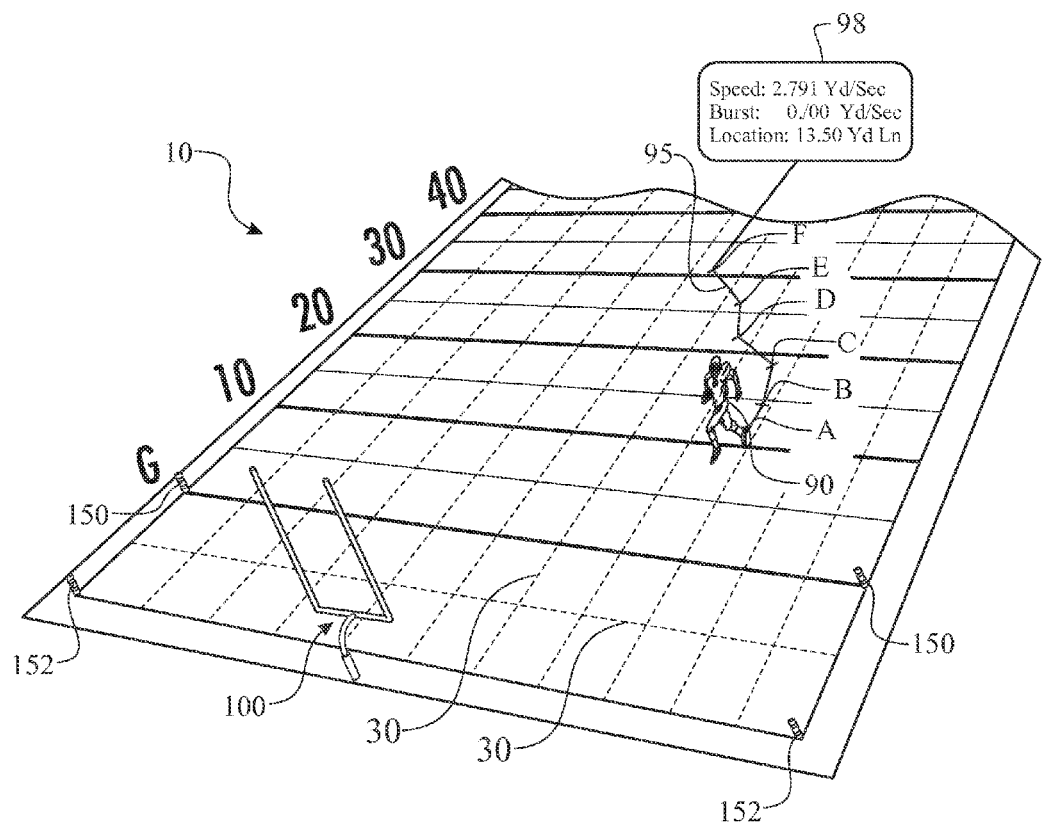
FIG. 15 is an isometric view of an exemplary embodiment integrating video with real time telemetry data in accordance with one embodiment of the present invention.

The Sports telemetry RTLS/RTSS or other RF System can include a video aspect being synchronized to the telemetry data described above, wherein an exemplary embodiment is presented in FIG. 15. The Sports telemetry RTLS/RTSS or other RF system of the present invention may transmit game or practice sports player(s) performance metrics, data, analytics and/or statistics, sports and game object metrics, data, analytics and/or statistics, game official performance metrics, data, analytics and/or statistics and "Field of Play" data 10 to a video component in real time. After receipt of the telemetry data, the data may be processed so that it can be synchronized, integrated and/or superimposed onto to the live video or recorded telecast feed from with the real time performance metrics, data, analytics and/or statistics to the live video or recorded telecast feed from video camera(s) recording the sports event. The telemetry data may be used as part of a 360-degree dynamic view based on the camera angles and perspective relative to the acquired sports player(s) performance metrics, data, analytics and/or statistics sports and game object metrics, data, analytics and/or statistics, game official performance metrics, data, analytics and/or statistics and "Field of Play" 10. The video and telemetry data can include markers to aid in synchronizing the two components. The system's acquired RF performance metrics, data, analytics and/or statistics may be integrated with the live video or recorded feed via various methods. One method includes transmitting the sports participants "player(s)" performance metrics, data, analytics and/or statistics, sports and game object metrics, data, analytics and/or statistics, game official (referee, umpire, etc.) performance metrics, data, analytics and/or statistics and "Field of Play" 10 directly to the live video feed network from the Sports telemetry RTLS/RTSS system for instant use on the live or recorded telecast to superimpose the performance metrics, data, analytics and/or statistics. A second method includes using a device, for example a Multiplexer (MUX) or encoder, with the telemetry system to encode the player's field of view data with other acquired metrics, data analytics and/or statistics to provide a 360 degree dynamic view based on the camera angle and perspective relative to the sports player(s) performance metrics, data, analytics and/or statistics, sports and game object metrics, data, analytics and/or statistics, game official performance metrics, data, analytics and/or statistics and "Field of Play" 10.

In the exemplary embodiment, a monitored player 90 is shown in motion on the "Field of Play" 10 at an end user display or base, local and/or remote computer system display, for example. Data points (referenced as A through F) are collected at a series of intervals taken along the player's route 95. The data collection points and/or intervals can be based upon any of a variety of instigators, for example time, impact, location, an event, and the like. The collected data can be presented in balloon styled information blocks 98 extending from the data collection point. Although the exemplary illustration presents a monitored player 90, it is understood the system can include a plurality of players, data referencing the game or sports object, 68, game markers 80, and the like. The video can be obtained in accordance with a horizontal orientation, thus incorporating a height (Z axis) component. The telemetry system of the present invention allows a 3D rendition and/or a 360 degree rendition of the sports participants, sports objects, field of play and sports components and their performance metrics, data, analytics and/or statistics from a variety of angles and perspectives, comprising of an X-Y-Z spatial representation, enabling a 360° degree spatial representation The method of the present invention may provide a planar (2D) and a spatial (3D) coordinate position for performance metrics, data, analytics and/or statistics acquisition, collection, processing, exportation and recordings, and may display the processed information in a 360° performance view to assist in the training of athletes, injury recovery analysis and provide additional insights to players, coaches, scouts, Fantasy Sports and fans.

The method of the present invention may receive from at least one telemetry module and/or sensor a plurality of signals comprised of first, second and third signals and then processing these signals from three different locations. Another embodiment includes the step of processing the received first and second signals and extracting location information to calculate position and/or movement information. Yet another example uses calculating signal phase information with statistical steps and/or algorithms of the signals to calculate location, speed, velocity and other performance metrics and data wherein the processing step is carried out in real time during a sports event.

Figure 16:
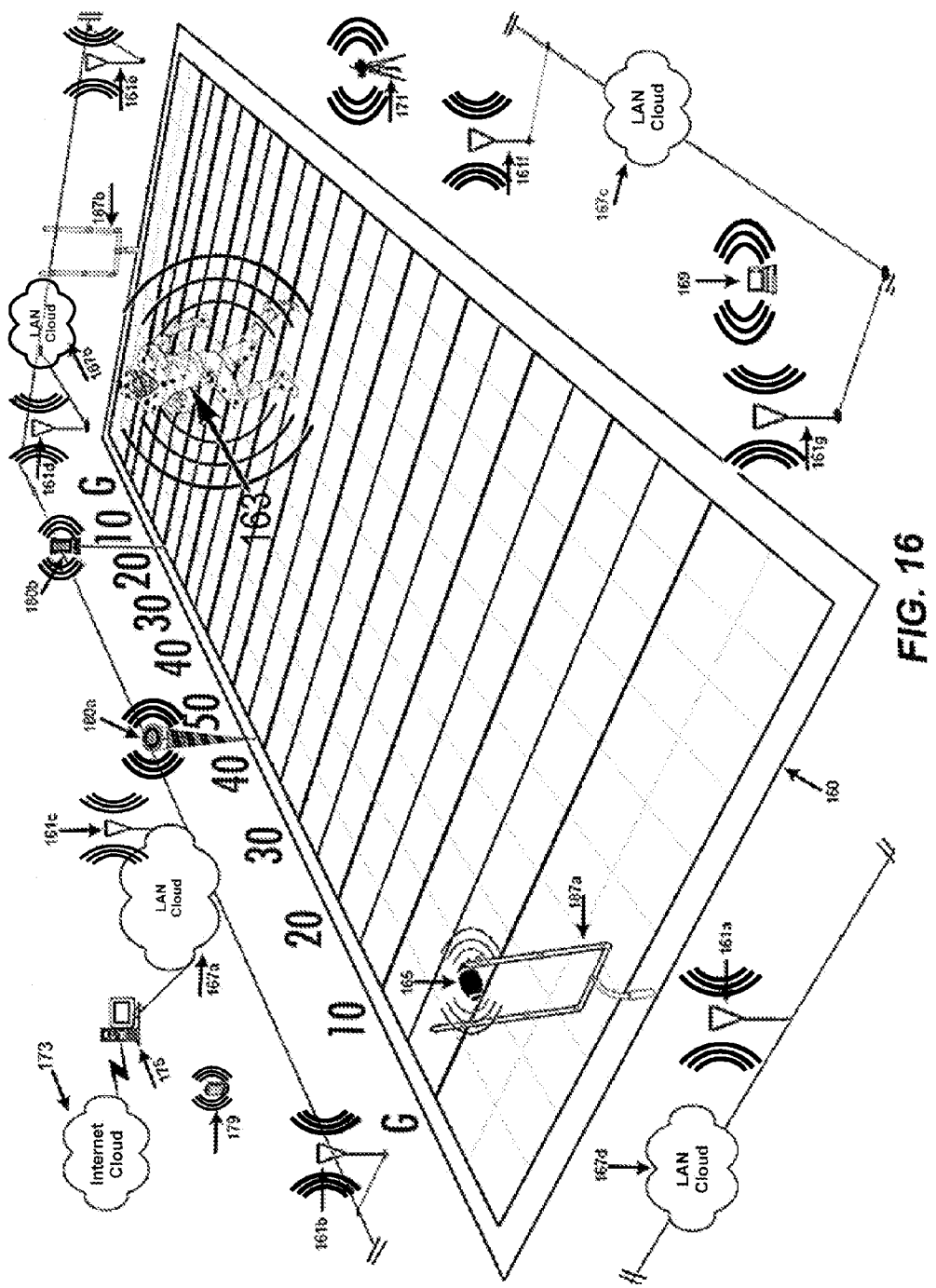
FIG. 16 illustrates a simplified view of a sports real time locating and sensing system in accordance with one embodiment of the present invention.
Figure 17:
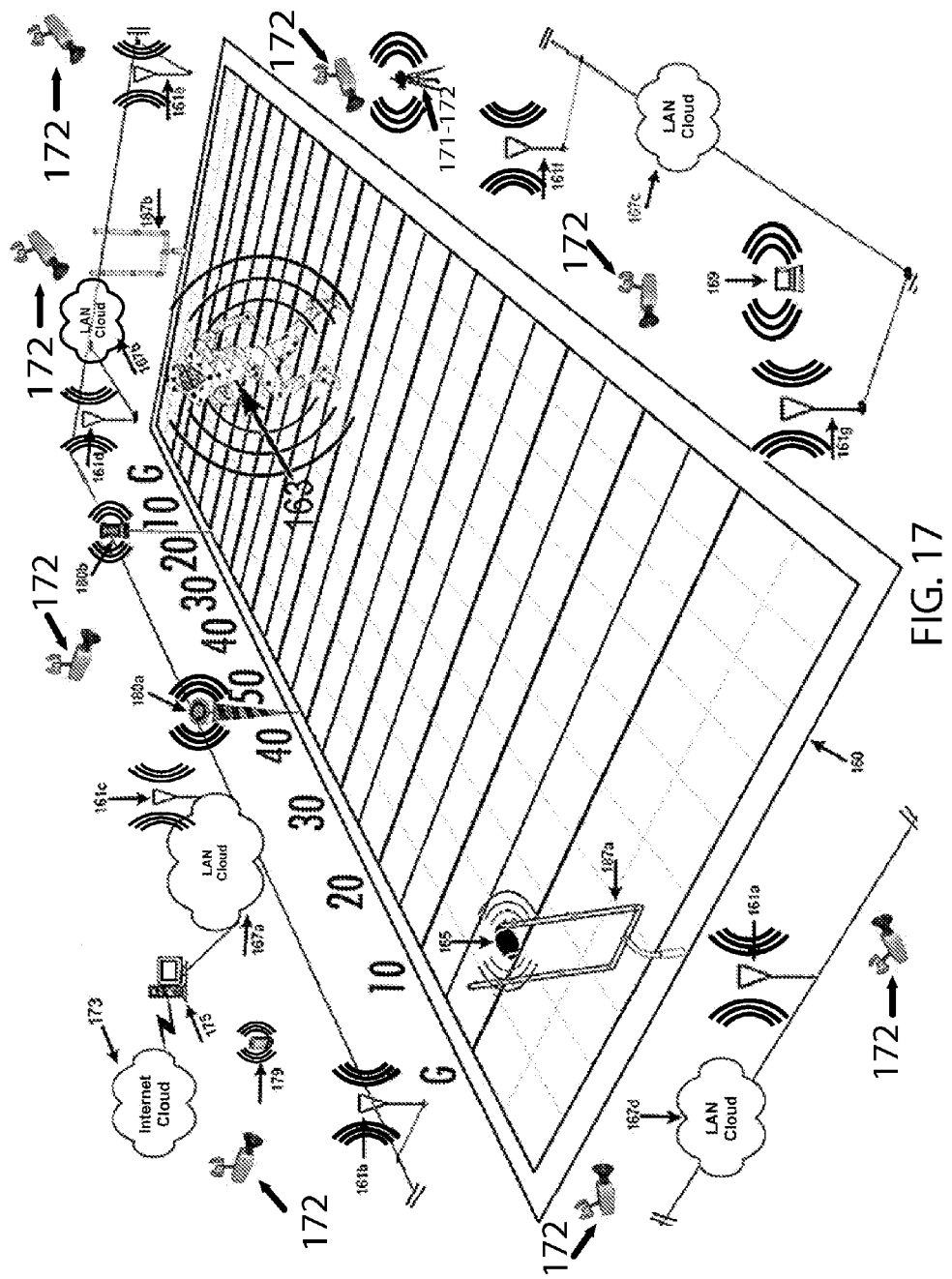
FIG. 17 illustrates a simplified view of a sports real time locating and sensing system in accordance with one embodiment of the present invention which includes a predictive action and/or telemetry acquisition video tracking camera system based on performance metrics, data, analytics and/or statistics.

The RF tags/sensors can provide a variety of information. The RTLS/RTSS RFID Tags/sensors may be embedded in the equipment, attached, affixed to the apparel (snap, stitched, in pockets, and the like), or affixed to the athlete, sports participant, sports official (referee, umpire, etc.), sports object and field equipment. The RTLS/RTSS or other RF tags/sensors with RFID may be encased or embedded, and/or as electronic chip with pressure-sensitive properties. The RTLS/RTSS or other RF system RFID tags and/or RTSS tags/sensors include sensing functionality comprising of tracking, location & positioning, direction (forward/reverse/sideways), speed, burst and/or acceleration, velocity, impact (in G-Force), body temperature and heart rate to list a few. The body temperature and heart rate devices may be incorporated in RFID tags or other types of device sensors. In some embodiments the RTLS/RTSS or other RF system sensors and tags can be embedded or affixed in the athletic shoes (soles, cleats, etc.) or strapped or taped and they will be able to allow the Sports telemetry RTLS/RTSS or other RF System to track players' footsteps and act as pedometers. The following list is an example of the possible multiple RTLS/RTSS or other RF system RFID tags/sensors placement that may be used for (American) Football on the player sports equipment, apparel and/or person, "Field of Play" 10 and sports objects:

A. Helmet
B. Shoulder pads (top, front & back)
C. Chest and back
D. Back Pad
E. Hands
F. Elbows
G. Thigh Pads
H. Knee Pads
I. Cleats/Shoes
J. Football (ball)
K. Yard Sticks (Scrimmage Line & First Down)
L. Yard Markers
M. Field Goal Posts
N. End Zone Markers
O. Practice Equipment
  1. Tackling dummies
  2. Blocking Sleds
  3. Blocking Pads FIG. 16 illustrates one embodiment of the present invention. FIG. 17 illustrates a similar embodiment to the embodiment of FIG. 16 with the exception that FIG. 17 also illustrates predictive action cameras 172.

FIG. 16 illustrates a playing field 160 for a sporting event comprised of a football field or playing surface, a sports participant 163, a football player, and a sports object 165, a football. The sports participant 163 and the sports object 165 include telemetry modules and/or sensors embedded or affixed thereto, for example. Sensors and tags may also be deployed at down markers 180a-b and at goal posts 187a-b to detect and transmit telemetry data related to position of the ball, for example, with regards to the markers and posts. Alternatively, multifunctional sensors which can perform all the aforementioned functions of RTLS/RTSS may be attached or embedded. In one embodiment, the sensor modules may connect electronically and/or via wireless communication using Radio Frequencies (RF) to the telemetry module and to the base, local and/or remote computer system and/or end user devices.

The receivers 161a-g may be deployed at various locations in or around the field 160 for receiving telemetry data (e.g., performance metrics, data, analytics and/or statistics). In the illustrated embodiment, the received telemetry data is forwarded to a base, local and/or remote computer system 169 and/or 175, for processing, through a local area network (LAN), WAN or wireless cloud 167a-d. Artisans will recognize that the received telemetry data may be forwarded to the base, local and/or remote computer system 169 and/or 175 through other communication means.

FIG. 17 illustrates a camera 171 and a plurality of predictive action cameras or video capture devices 172. Those cameras may be implemented as autonomous, manual, automatic and/or programmed video cameras to acquire, capture and/or synchronize, according to the sports action or game situation, performance metrics, data, analytics and/or statistics by predictive methods, applications, algorithms, or programming. The transmitting, capturing and/or recording of the sports event by use of the video camera tracking system may be based on telemetry acquisition data which may include current, anticipated, detected, expected, predictive or future action. The predictive action cameras may be controlled to aim in a predicted direction that anticipates movement of a player or a sports object based on previously acquired performance data and/or performance data acquired in real time. The performance metrics, analytics and statistics related to a particular player may show or indicate that the player is likely to move or run in a particular direction based on a particular situation (e.g., in the game of soccer a goal keeper trying to save a penalty shot from a famous forward may tend to jump to the right each time the forward attempts a penalty shot). In that event, the predictive action cameras can be controlled to aim in the anticipated direction of movement based on the player location or game situation, based on the historical data and/or real-time performance data, including game status.

The base, local and/or remote computer system 169 and/or 175 may process the telemetry data, for example, by generating additional performance metrics, data, analytics and/or statistics, superimposing the telemetry data with live video of the sports event, creating 3D images sequences of play, comparing the telemetry data with historical statistics, analytics, etc. The processed data may be forwarded or exported by the base, local and/or remote computer system 169 to remote computer 175 over the Internet 173, for example, for display or further processing of the telemetry data and/or video signal. Likewise, the processed data may be forwarded or exported to end remote PDAs 179 or other devices over a wireless or wired network for display or further processing of the telemetry data and/or video signal. Alternatively, the telemetry data and/the live video or recorded feed signal may be forwarded to PDA 179 (e.g., through a wireless network) and computer 175, bypassing the base, local and/or remote computer system 169 (e.g., directly through a LAN 167a), for processing which may include generating additional performance metrics, data, analytics and/or statistics, superimposing the telemetry data with live or recorded video of the sports event, creating 3D images sequences of play, comparing the telemetry data with historical statistics, etc. In yet another alternative embodiment the telemetry data is received by the camera or plurality of cameras 171 and/or 172 transmitting, capturing and/or recording the sports event and using predictive action/performance data and/or video based tracking for real time processing (e.g., superimposition of live video signal with telemetry data) and for transmission of the processed signal to the base, local and/or remote computer system 169 and/or 175, for example. The data processed by the system of the present invention may be transmitted, exported and/or uploaded to websites for access compromised of Fantasy Football, owners/players, fantasy football leagues, football leagues, sports leagues, scouts, video game designers, fans, coaches, etc.

The present invention includes systems and methods for acquiring, collecting, exporting, storing, communicating and delivering sports performance metrics, data, analytics, and/or statistics from individual sports participants, entire sports teams, sports officials (referees), field of play, field and sports equipment and/or sports objects, during actual sporting events/games and/or practice events to objectively quantify, evaluate, and analyze player and team performances.

The present invention, explained through illustrative, non-limiting examples above provides many benefits. The Sports telemetry RTLS/RTSS system of the present invention adds a new, unique, and inside perspective of the game within the game to gain extensive knowledge and insight to sports, its players and components, for example. The Sports telemetry RTLS/RTSS system helps to quantify a player's training, practice, gauge injury recovery and game performance in an objective manner.

The Sports telemetry RTLS/RTSS or other RF system can be applied to all major sports comprising of Football (American), Hockey, Basketball, Baseball, boxing, ultimate fighting, mixed martial arts and Soccer at all competitive levels including, but not limited to professional, college, high school, private leagues, and semi-pro sports. The Sports telemetry RTLS/RTSS or other RF system also applies to all major fantasy sports comprising of Fantasy Football, Baseball, Basketball and Soccer. It may also be applied to other sports comprising of horse and dog racing and other competitions.

The present invention is a comprehensive system which directly benefits teams, coaches, scouts, agents, fantasy sports comprising of fantasy football and fans who receive critical performance metrics, data, analytics and/or statistics to objectively quantify and analyze athletic performances and ability, thereby enhancing the appreciation of the player's athletic accomplishments with new historical perspectives which also include historical, commercial and entertainment value. For example, potential player scouting and drafting are critical components of a team's future. Teams and coaches may also use the present invention to evaluate and/or quantify present and potential athletes, their game or practice performances, and plan game strategies based upon opponents, athletic abilities based on new performance metrics, data, analytics and/or statistics. Coaches can use the real time information to instant make analysis and adjustments from the sidelines or later with film-study sessions. The present invention is useful to safeguard team owner as well as the teams' investments with game new objective game and practice performance metrics, data, analytics and/or statistics.

The present invention directly benefits teams, coaches, scouts, agents, fantasy sports, fantasy football and fans who receive critical performance metrics, data, analytics and/or statistics, including data used to predict performance and sports action, for example, which may be integrated with a video camera control system for tracking sports objects, or sports participants, sports officials, the tracking based on telemetry acquisition comprised of current, anticipated, detected, expected, predictive or future action. The present invention also objectively quantifies and analyzes athletic performances, game performances, match-ups and ability, thereby enhancing the appreciation of the player's athletic accomplishments with new historical perspectives which also include commercial and entertainment value. Thus the present invention includes a predictive action video camera tracking system based on telemetry acquisition which may be integrated with other systems for sports events comprised of games and/or practices.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in many other ways, using equivalents and alternatives that do not depart from the scope of the following claims. Moreover, unless indicated to the contrary in the preceding description, none of the components described in the implementations are essential to the invention.

What is claimed is:

1. A method for collecting sports data comprising the steps of:
receiving from one or more telemetry modules mounted, affixed, or embedded on at least one sports participant, a first signal carrying data corresponding to relative position, identification, movement, speed, velocity, impact, position, biological data or condition of said at least one sports participant;
receiving from one or more telemetry modules mounted, affixed, or embedded in a sports object, a second signal carrying data corresponding to relative position, identification, movement, speed, velocity, impact, position or condition of said sports object; and
processing the received first and second signal to calculate position information or movement information of the sports object or the at least one sports participant in relation to a playing surface of a sports event.

2. The method of claim 1, wherein the processing step comprises extracting location information from said first and second signal.

3. The method of claim 1, further comprising processing the received first and second signal to calculate performance metrics, data, analytics or statistical data related to relative position, identification, movement, speed, velocity, impact, position, biological data or condition of a sports participant or a sports object.

4. The method of step 1, wherein the processing step is carried out in real time during a sports event.

5. The method of claim 1, further comprising displaying progressive movement of the sports participant or the sports object.

6. The method of claim 5, wherein the step of displaying comprises displaying said progressive movement as a sequence of three-dimensional images.

7. The method of claim 1, wherein said sports event include a practice session.

8. The method of claim 1, wherein said condition comprises at least one of the following:
heart rate; or
body temperature.

9. The method of claim 1, wherein said sports participant includes a sports official.

10. The method of claim 1, wherein said first and second signal are received over a wireless communications link.

11. The method of claim 10, wherein the communications link may be established using an Ultra-Wide Band link.

12. The method of claim 1, further comprising;
processing said first or second signal to calculate performance metrics, data, analytics or statistics.

13. The method of claim 12, further comprising:
receiving a live video signal from cameras recording the sports event;
processing said video signal to superimpose said performance metrics, data, analytics or statistics onto the video signal; and
displaying the video signal with the superimposed performance metrics, data, analytics or statistics.

14. The method of claim 1, wherein said sports object comprises a stationary or a moving object.

15. The method of claim 1, further comprising:
receiving from said one or more telemetry modules, third signals carrying data corresponding to the proximity of a moving sports object or said sports participant to a stationary object placed in a location where the sports event takes place.

16. A system for acquiring, determining or using performance metrics, data, analytics and/or statistics comprising:
a plurality of sensors configured to acquire a plurality of data corresponding to the performance of at least one sports participant in real time, wherein at least a subset of the plurality of sensors is attached to the sports participant or equipment used by the sports participant;
a plurality of telemetry modules for wirelessly communicating data acquired by the plurality of sensors to a local or a remote processing module; and
a local or remote processing module configured to use the acquired data to determine performance, analytics, statistics or metrics data of the sports participant.

17. The system of claim 16 further comprising a user interface for interactively communicating the performance metrics, data, analytics or statistics to a plurality of system users.

18. The system of claim 16, wherein the plurality of sensors is at least one of a biological sensor, a telemetry sensor, a location sensor, or an audiovisual sensor.

19. The system of claim 16, further comprising at least one autonomous video camera for tracking sports participants or sports objects.

20. The system of claim 19, wherein said at least one autonomous video camera is a predictive action camera.

21. The system of claim 16, wherein at least one sensor from said plurality of sensors is attached to at least one of:
a ball,
football down markers,
end zone markers,
goal zone markers,
goal posts,
tackling dummies,
training equipment,
blocking pads,
tackling sleds,
delineating boundaries,
yard sticks,
yard markers, or,
scrimmage line.

22. The system of claim 19, wherein the autonomous camera utilizes performance, analytics, statistics or metrics data of a sports participant or a sports object to capture the action of the sports participant or sports object autonomously, or to predict or anticipate said action and capture the action in the predicted or anticipated area where the action is or will be occurring.

23. The system of claim 16, further comprising communication modules for communicating the performance metrics, data, analytics or statistics to at least one of a system hosting a fantasy sports application, a broadcasting station, or Internet website, to allow access to said performance metrics, data, analytics or statistics.

24. The system of claim 16, wherein the plurality of telemetry devices are capable of communication with other to relay the acquired data to a local or remote computer system or to end user devices through a wireless, direct link or through a network.

25. The system of claim 16, wherein the sports participant includes at least one of:
an American football player,
a hockey player,
a basketball player,
a baseball player,
a race horse,
a race dog,
a boxer,
a mixed martial arts participant, or
a soccer player.

26. The system of claim 16, wherein the plurality of sensors comprise at least one camera with an eye tracking function and one camera for capturing a field of view of the sports participant.

27. The system of claim 16, further comprising a computing device configured to display a series of location data points, for a sports participant or sports object, indicating speed, velocity, or impact and for tracking the progressive movement of said sports participant or sports object in real time; wherein the course of movement of a sports participant, multiple sports participants or a sports object may be displayed in relation to a field location for an X-Y-Z spatial representation including a 360° degree spatial representation.

28. The system of claim 27, wherein the computing device further displays speed burst, impact (G-Force), distance traveled, forward, backward, horizontal and vertical movement, vertical leap or jumps, or in the "Field of Play" location information.

29. The system of claim 16, further comprising an end user device for using the acquired data to determine performance, analytics, statistics or metrics data for the sports participant.

30. The system of claim 29, wherein the end user device superimposes said performance, analytics, statistics or metrics data for the sports participant onto a live or recorded video broadcast of a sports event or practice session.

31. The system of claim 30, wherein the end user device includes a computer, tablet, PDA or a smart phone.

32. The system of claim 30, wherein the end user device uses said performance, analytics, statistics or metrics data for the sports participant in a Fantasy Sports application.

33. The system of claim 30, wherein the end user device uses said performance, analytics, statistics or metrics data for the sports participant in a video game.

34. The system of claim 16, further comprising:
means for generating visual representations of:
field location of a sports participant, sports team, sports official, or sports object;
movement of a sports participant, sports team, sports official, or sports object;
speed of a sports participant, sports team, sports official, or sports object;
velocity of a sports participant, sports team, sports official, or sports object;
reaction time and response of a sports participant, sports team, or sports official;
biological data of a sports participant, sports team, or sports official, said biological data at least one of heart rate or body temperature;
hit, tackle, blocking or impact intensity level of a sports participant, sports team, or sports official;
vertical leap, jump or distance traveled of a sports participant, sports team, sports official, or sports object;
rotation, angle, ground impact, kick or punt impact of a sports object; or
comparison of ball spotting, marking, scoring or field measurements with location of sports participant, sports team, or sports official.

35. The system of claim 16, wherein the sports equipment comprises at least one of:
a helmet,
gloves,
a uniform,
shoes, shoulder pads,
back pad,
elbow pad,
thigh pads,
knee pads, or
cleats.

36. A method for determining and using performance metrics, data, analytics or statistics comprising:
acquiring a plurality of data through a plurality of wireless sensors for at least one sports participant, said plurality of data corresponding to the performance of the at least one sports participant;
communicating the plurality of acquired data using a plurality of telemetry modules to a remote processing module; and
configuring the remote processing module to use the plurality of data to determine a plurality of performance metrics, data, analytics or statistics for the sports participant during a sporting event.

37. The method of claim 36 further comprising interactively communicating the plurality of performance metrics, data, analytics or statistics to a plurality of users using at least one user interface.

38. The method of claim 36, wherein at least one of the performance metrics, data, analytics or statistics is displayed on live or recorded telecasts of the sports participant or team of the sports participant.

39. The method of claim 36, wherein at least one of the performance metrics, data, analytics or statistics is provided for use by sports modeling software applications including fantasy sports websites.

40. The method of claim 39, wherein the software application is a software engine or application enabling multiple user interaction and interfaces as part of a fantasy sports league or sports website.

41. The method of claim 40, wherein the fantasy sports league is a fantasy football league.

42. The method of claim 36, wherein at least one of the performance metrics, data, analytics or statistics is provided for use by video games.

43. The method of claim 36, wherein at least one of the performance metrics, data, analytics or statistics is used in at least one of an analytical or a predictive analysis of the sports participant.

44. The method of claim 43, wherein said analysis includes match-up, scouting, positional, athletic, or injury recovery information.

45. The method of claim 36, wherein the plurality of performance metrics, data, analytics or statistics are causally linked to a plurality of video signals captured through at least one of the sensors associated with a player or a video camera, the plurality video signals being tractable and superimposed with said performance metrics, data, analytics or statistics.

46. The method of claim 36, wherein the method is performed in real time.

47. The method of claim 36, further comprising determining performance metrics, data, analytics or statistics for individual sports participants, entire sports teams, sports officials, or sports objects based on the acquired data, during actual sporting events or practice sessions to objectively quantify, evaluate, and analyze player and team performances in real time.

* * * * *